US012077190B2

(12) United States Patent
Ng et al.

(10) Patent No.: US 12,077,190 B2
(45) Date of Patent: Sep. 3, 2024

(54) EFFICIENT SAFETY AWARE PATH SELECTION AND PLANNING FOR AUTONOMOUS MACHINE APPLICATIONS

(71) Applicant: NVIDIA Corporation, Santa Clara, CA (US)

(72) Inventors: Julia Ng, San Jose, CA (US); David Nister, Bellevue, WA (US); Zhenyi Zhang, San Jose, CA (US); Yizhou Wang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 542 days.

(21) Appl. No.: 16/877,127

(22) Filed: May 18, 2020

(65) Prior Publication Data

US 2021/0354729 A1 Nov. 18, 2021

(51) Int. Cl.
*B60W 60/00* (2020.01)
*B60W 30/095* (2012.01)

(52) U.S. Cl.
CPC .. *B60W 60/00272* (2020.02); *B60W 30/0953* (2013.01); *B60W 60/0011* (2020.02);
(Continued)

(58) Field of Classification Search
CPC ....... B60W 60/00272; B60W 30/0953; B60W 60/0011; B60W 60/0018;
(Continued)

(56) References Cited

U.S. PATENT DOCUMENTS 6,393,362 B1 * 5/2002 Burns .................. G05D 1/0297
701/119
7,221,797 B2 5/2007 Koshizen et al.
(Continued)

FOREIGN PATENT DOCUMENTS

CN 106428009 A 2/2017
CN 106740457 A 5/2017
(Continued)

OTHER PUBLICATIONS

"Taxonomy and Definitions for Terms Related to Driving Automation Systems for On-Road Motor Vehicles", National Highway Traffic Safety Administration (NHTSA), a Division of the US Department of Transportation, and the Society of Automotive Engineers (SAE), Standard No. J3016-201609, pp. 1-30 (Sep. 30, 2016).

(Continued)

*Primary Examiner* — James J Lee
*Assistant Examiner* — Wenyuan Yang
(74) *Attorney, Agent, or Firm* — Taylor English Duma L.L.P.

(57) ABSTRACT

In various examples, systems and methods are disclosed for weighting one or more optional paths based on obstacle avoidance or other safety considerations. In some embodiments, the obstacle avoidance considerations may be computed using a comparison of trajectories representative of safety procedures at present and future projected time steps of an ego-vehicle and other actors to ensure that each actor is capable of implementing their respective safety procedure while avoiding collisions at any point along the trajectory. This comparison may include filtering out a path(s) of an actor at a time step(s)—e.g., using a one-dimensional lookup—based on spatial relationships between the actor and the ego-vehicle at the time step(s). Where a particular
(Continued)

path—or point along the path—does not satisfy a collision-free standard, the path may be penalized more negatively with respect to the obstacle avoidance considerations, or may be removed from consideration as a potential path.

21 Claims, 14 Drawing Sheets

(52) U.S. Cl.
CPC .  *B60W 60/0018* (2020.02); *B60W 2554/4041* (2020.02); *B60W 2554/4042* (2020.02); *B60W 2554/80* (2020.02)
(58) Field of Classification Search
CPC .  B60W 2554/4041; B60W 2554/4042; B60W 2554/80; B60W 2050/0025; B60W 30/0956; B60W 60/00276
See application file for complete search history.

(56) References Cited

U.S. PATENT DOCUMENTS

| | | | |
|---|---|---|---|
| 7,409,295 | B2 | 8/2008 | Paradie |
| 7,565,006 | B2 | 7/2009 | Stam et al. |
| 8,204,642 | B2 | 6/2012 | Tanaka et al. |
| 8,352,111 | B2 | 1/2013 | Mudalige |
| 9,373,057 | B1 | 6/2016 | Erhan et al. |
| 9,489,635 | B1 | 11/2016 | Zhu |
| 9,555,781 | B2 | 1/2017 | Breuer et al. |
| 9,701,307 | B1 | 7/2017 | Newman et al. |
| 10,007,269 | B1 | 6/2018 | Gray |
| 10,053,091 | B2 | 8/2018 | Jiang et al. |
| 10,108,867 | B1 | 10/2018 | Vallespi-Gonzalez et al. |
| 10,133,274 | B2 | 11/2018 | Shashua et al. |
| 10,134,278 | B1 | 11/2018 | Konrardy et al. |
| 10,137,896 | B2 | 11/2018 | Zhuang et al. |
| 10,139,831 | B2 | 11/2018 | Yan |
| 10,157,331 | B1 | 12/2018 | Tang et al. |
| 10,289,469 | B2 | 5/2019 | Fortino et al. |
| 10,363,960 | B2 | 7/2019 | Stefan et al. |
| 10,372,136 | B2 | 8/2019 | Yang et al. |
| 10,489,972 | B2 | 11/2019 | Atsmon |
| 10,579,053 | B2 | 3/2020 | Haynes et al. |
| 10,580,158 | B1 | 3/2020 | Mousavian et al. |
| 10,599,546 | B1 | 3/2020 | Walther et al. |
| 10,625,748 | B1 | 4/2020 | Dong et al. |
| 10,635,110 | B2 | 4/2020 | Shashua et al. |
| 10,698,407 | B2 | 6/2020 | Ostafew |
| 10,730,517 | B2 | 8/2020 | Park et al. |
| 10,739,778 | B2 | 8/2020 | Winkler et al. |
| 10,740,954 | B2 | 8/2020 | Liu |
| 10,776,985 | B2 | 9/2020 | Liu et al. |
| 10,816,978 | B1 | 10/2020 | Schwalb et al. |
| 10,829,793 | B2 | 11/2020 | Arikawa et al. |
| 10,843,690 | B2 | 11/2020 | Shalev-Shwartz et al. |
| 10,885,698 | B2 | 1/2021 | Muthler et al. |
| 10,942,030 | B2 | 3/2021 | Haque et al. |
| 10,997,433 | B2 | 5/2021 | Xu et al. |
| 11,042,163 | B2 | 6/2021 | Chen et al. |
| 11,079,764 | B2 | 8/2021 | Nister et al. |
| 11,080,590 | B2 | 8/2021 | Smolyanskiy et al. |
| 11,099,558 | B2 | 8/2021 | Huang et al. |
| 11,182,917 | B2 | 11/2021 | Kang et al. |
| 11,188,794 | B2 | 11/2021 | Yao et al. |
| 11,189,172 | B2 | 11/2021 | Branscombe et al. |
| 11,370,423 | B2 | 6/2022 | Casas et al. |
| 11,467,590 | B2 | 10/2022 | Halder |
| 11,604,470 | B2 | 3/2023 | Nister et al. |
| 11,966,228 | B2 | 4/2024 | Nister et al. |
| 2004/0252864 | A1 | 12/2004 | Chang et al. |
| 2007/0021912 | A1 | 1/2007 | Morita et al. |
| 2007/0154068 | A1 | 7/2007 | Stein et al. |
| 2007/0182528 | A1 | 8/2007 | Breed et al. |
| 2009/0093960 | A1 | 4/2009 | Puhalla et al. |
| 2009/0125177 | A1 | 5/2009 | Tanaka et al. |
| 2009/0256840 | A1 | 10/2009 | Varadhan et al. |
| 2010/0256852 | A1* | 10/2010 | Mudalige ............... G08G 1/164 701/24 |
| 2010/0324771 | A1 | 12/2010 | Yabushita et al. |
| 2011/0246156 | A1 | 10/2011 | Zecha et al. |
| 2013/0054106 | A1 | 2/2013 | Schmudderich et al. |
| 2015/0054824 | A1 | 2/2015 | Jiang |
| 2015/0346716 | A1 | 12/2015 | Scharfe et al. |
| 2016/0001775 | A1 | 1/2016 | Wilhelm et al. |
| 2016/0247290 | A1 | 8/2016 | Liu et al. |
| 2016/0321074 | A1 | 11/2016 | Hung et al. |
| 2017/0010108 | A1 | 1/2017 | Shashua |
| 2017/0090478 | A1 | 3/2017 | Blayvas et al. |
| 2017/0220876 | A1 | 8/2017 | Gao et al. |
| 2017/0236013 | A1 | 8/2017 | Clayton et al. |
| 2017/0259801 | A1 | 9/2017 | Abou-Nasr et al. |
| 2017/0344808 | A1 | 11/2017 | El-Khamy et al. |
| 2017/0364083 | A1 | 12/2017 | Yang et al. |
| 2017/0371340 | A1 | 12/2017 | Cohen et al. |
| 2018/0032082 | A1 | 2/2018 | Shalev-Shwartz et al. |
| 2018/0089833 | A1 | 3/2018 | Lewis et al. |
| 2018/0121273 | A1 | 5/2018 | Fortino et al. |
| 2018/0136332 | A1 | 5/2018 | Barfield, Jr. et al. |
| 2018/0158244 | A1 | 6/2018 | Ybanez Zepeda et al. |
| 2018/0173240 | A1 | 6/2018 | Fang et al. |
| 2018/0188059 | A1 | 7/2018 | Wheeler et al. |
| 2018/0203959 | A1 | 7/2018 | Refsnaes et al. |
| 2018/0232663 | A1 | 8/2018 | Ross et al. |
| 2018/0239361 | A1 | 8/2018 | Micks et al. |
| 2018/0251153 | A1 | 9/2018 | Li et al. |
| 2018/0253103 | A1 | 9/2018 | Winkler et al. |
| 2018/0267558 | A1 | 9/2018 | Tiwari et al. |
| 2018/0275657 | A1 | 9/2018 | You |
| 2018/0276278 | A1 | 9/2018 | Cagan et al. |
| 2018/0342157 | A1 | 11/2018 | Donnelly et al. |
| 2018/0348374 | A1 | 12/2018 | Laddha et al. |
| 2018/0349746 | A1 | 12/2018 | Vellespi-Gonzalez |
| 2018/0365740 | A1 | 12/2018 | Nix et al. |
| 2018/0370540 | A1 | 12/2018 | Yousuf et al. |
| 2018/0373980 | A1 | 12/2018 | Huval |
| 2019/0016285 | A1 | 1/2019 | Freienstein et al. |
| 2019/0025841 | A1* | 1/2019 | Haynes ............... G05D 1/0214 |
| 2019/0065933 | A1 | 2/2019 | Bogdoll et al. |
| 2019/0066328 | A1 | 2/2019 | Kwant et al. |
| 2019/0071101 | A1 | 3/2019 | Emura et al. |
| 2019/0102646 | A1 | 4/2019 | Redmon et al. |
| 2019/0102668 | A1 | 4/2019 | Yao et al. |
| 2019/0129831 | A1 | 5/2019 | Goldberg |
| 2019/0146515 | A1 | 5/2019 | De Salvo et al. |
| 2019/0147600 | A1 | 5/2019 | Karasev et al. |
| 2019/0147610 | A1 | 5/2019 | Frossard et al. |
| 2019/0171912 | A1 | 6/2019 | Vellespi-Gonzalez et al. |
| 2019/0179979 | A1 | 6/2019 | Melick |
| 2019/0212749 | A1 | 7/2019 | Chen et al. |
| 2019/0213481 | A1 | 7/2019 | Godard et al. |
| 2019/0235515 | A1 | 8/2019 | Shirvani et al. |
| 2019/0250622 | A1 | 8/2019 | Nister et al. |
| 2019/0251442 | A1 | 8/2019 | Koivisto et al. |
| 2019/0258251 | A1 | 8/2019 | Ditty et al. |
| 2019/0258878 | A1 | 8/2019 | Koivisto et al. |
| 2019/0286153 | A1 | 9/2019 | Rankawat et al. |
| 2019/0287407 | A1* | 9/2019 | Branscombe ......... G08G 1/161 |
| 2019/0299984 | A1* | 10/2019 | Shalev-Shwartz ............ B60W 30/0956 |
| 2019/0302761 | A1 | 10/2019 | Huang et al. |
| 2019/0310650 | A1 | 10/2019 | Halder |
| 2019/0369616 | A1* | 12/2019 | Ostafew ......... B60W 60/00274 |
| 2019/0382007 | A1 | 12/2019 | Casas et al. |
| 2020/0013176 | A1 | 1/2020 | Kang et al. |
| 2020/0143205 | A1 | 5/2020 | Yao et al. |
| 2021/0039649 | A1* | 2/2021 | Yu ......................... G06V 20/58 |
| 2021/0286923 | A1 | 9/2021 | Kristensen et al. |

(56) References Cited

U.S. PATENT DOCUMENTS

| | | |
|---|---|---|
| 2023/0124848 A1 | 4/2023 | Nister et al. |
| 2024/0174219 A1 | 5/2024 | Nister et al. |

FOREIGN PATENT DOCUMENTS

| | | |
|---|---|---|
| CN | 106864454 A | 6/2017 |
| CN | 106608263 A | 12/2018 |
| DE | 102015221 920 A1 | 5/2017 |
| DE | 102015221920 A1 | 5/2017 |
| DE | 10 2015 226 762 A1 | 6/2017 |
| DE | 102015226762 A1 | 6/2017 |
| EP | 1930863 A2 | 6/2008 |
| EP | 2384009 A2 | 11/2011 |
| GB | 2547082 A | 8/2017 |
| KR | 20120009590 A | 2/2012 |
| WO | 2012011713 A2 | 1/2012 |
| WO | 2016183074 A1 | 11/2016 |
| WO | 2018/002910 A1 | 1/2018 |
| WO | 2018002910 A1 | 1/2018 |
| WO | 2018102717 A1 | 6/2018 |
| WO | 2018147874 A1 | 8/2018 |
| WO | 2018142394 A3 | 10/2018 |
| WO | 2018218155 A1 | 11/2018 |

OTHER PUBLICATIONS

"Taxonomy and Definitions for Terms Related to Driving Automation Systems for On-Road Motor Vehicles", National Highway Traffic Safety Administration (NHTSA), a Division of the US Department of Transportation, and the Society of Automotive Engineers (SAE), Standard No. J3016-201806, pp. 1-35 (Jun. 15, 2018).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
ISO 21448, "Road Vehicles—Safety of The Intended Functionality", International Organization for Standardization (ISO), Retrieved from Internet URL: https://de.wikipedia.org/wiki/ISO/PAS_21448, accessed on May 27, 2022, 3 Pages.
ISO 26262, "Hazard analysis and risk assessment {HARA}", Retrieved from Internet URL:https://github.com/userqin/SO26262/blob/master/hazard-analysis-and-risk-assessment-hara.md, accessed on Jun. 6, 2022, 5 pages.
Jayaraman, A., et al., "Creating 3D Virtual Driving Environments for Simulation-Aided Development of Autonomous Driving and Active Safety," SAE Technical Paper 2017-01-0107, Mar. 28, 2017, pp. 3.
Phillips, M., & Likhachev, M. "Sipp: Safe interval path planning for dynamic environments". In 2011 IEEE International Conference on Robotics and Automation (pp. 5628-5635). May 2011.
International Search Report and Written Opinion mailed Jul. 18, 2019 in International Patent Application No. PCT/US2019/017072, 16 pages.
International Preliminary Report on Patentabilty International Patent Application No. PCT/US2019/012535 mailed Jul. 16, 2020, 16 pages.
Non-Final Office Action dated Aug. 7, 2020, in U.S. Appl. No. 16/241,005, 22 pages.
Preinterview First Office Action dated Oct. 13, 2020 in U.S. Appl. No. 16/265,780, 15 pages.
First Action Without Interview dated Feb. 1, 2021 in U.S. Appl. No. 16/265,780, 15 pages.
Notice of Allowance dated Feb. 17, 2021 in U.S. Appl. No. 16/241,005, 7 pages.
Notice of Allowance dated Mar. 26, 2021 in U.S. Appl. No. 16/265,780, 5 Pages.
Final Office Action dated Oct. 14, 2021 in U.S. Appl. No. 16/269,921, 17 pages.
Non Final Office Action dated Feb. 10, 2022 in U.S. Appl. No. 16/269,921, 16 pages.
"Conservative Control for Zone Driving of Autonomous Vehicles Using Safe Time of Arrival", U.S. Appl. No. 62/628,831, filed Feb. 9, 2018.
"Methods for accurate real-time object detection and for determining confidence of object detection suitable for autonomous vehicles" U.S. Appl. No. 62/631,781, filed Feb. 18, 2018.
"Convolutional Neural Networks to Detect Drivable Freespace for Autonomous Vehicles" U.S. Appl. No. 62/643,665, filed Mar. 15, 2018.
"Deep Neural Network for Estimating Depth from Stereo Using Semi-Supervised Learning", U.S. Appl. No. 62/646,148, filed Mar. 21, 2018.
"Deep Learning for Path Detection in Autonomous Vehicles", U.S. Appl. No. 62/684,328, filed Jun. 13, 2018.
"Methods for High-Precision, High-Accuracy Lane Detection in Autonomous Driving Applications", U.S. Appl. No. 62/699,669, filed Jul. 17, 2018.
"Safety Decomposition Architecture for Autonomous Vehicle Planner" U.S. Appl. No. 63/108,439, filed Nov. 2, 2020.
Bojarski et al: "End to End Learning for Self-Driving Cars", Apr. 25, 2016 (Apr. 25, 2016), XP055570062, Retrieved from the Internet on Mar. 18, 2019: URL:https://nvidia.com/content/tegra/automotive/images/2016/solutions/pdf/end-to-end-dl-using-px.pdf.
International Search Report and Written Opinion mailed Oct. 17, 2019 in International Patent Application No. PCT/US2019/012535, 24 pages.
International Search Report and Written Opinion mailed Apr. 10, 2019 in International Patent Application No. PCT/US2019/016418, 13 pages.
Ching Y. Hung et al. "Programmable Vision Accelerator", U.S. Appl. No. 62/156,167, filed May 1, 2015.
Mohammed Abdulla Yousuf et al. "Methodology of Using a Single Controller (ECU) for a Fault-Tolerant/Fail-Operational Self-Driving System", U.S. Appl. No. 62/524,283, filed Jun. 23, 2017.
"System and Method for Controlling Autonomous Vehicles" U.S. Appl. No. 62/614,466, filed Jan. 7, 2018.
Bojarski et al: "End to End Learning for Self-Driving Cars", Apr. 25, 2016 (Apr. 25, 2016), XP055570062, Retrieved from the internet on Apr. 14, 2020 from URL <https://images.nvidia.com/content/tegra/automotive/images/2016/solutions/pdf/end-to-end-dl-using-px.pdf>.
Ching T. Hung et al. "Programmable Vision Accelerator", U.S. Appl. No. 62/156,167, filed May 1, 2015.
Mohammed Abdulla Yousuf et al. "Methodology of Using a Sngle Controller (ECU) for a Fault-Tolerant/Fail-Operational Self-Driving System", U.S. Appl. No. 62/524,283, filed Jun. 23, 2017.
"An Introduction to the Safety Force Field—Nvidia." Mar. 1, 2019. Retrieved from the internet on Jan. 8, 2020 from URL: <https://www.nvidia.com/content/dam/en-zz/Solutions/self-driving-cars/safety-force-field/an-introduction-to-t he-safety-force-field-v2.pdf>.
"Safety Procedures in Autonomous Vehicles," U.S. Appl. No. 62/768,064, filed Nov. 11, 2018.
"Safety Procedures in Autonomous Vehicles," U.S. Appl. No. 62/760,916, filed Nov. 13, 2018.
Bojarski, Mariusz; "End to End Learning for Self-Driving Cars", https://arxiv.org/abs/1604.07316; Apr. 25, 2016, 9 pgs.
Nister, David; Non-Final Office Action for U.S. Appl. No. 17/356,337, filed Jun. 23, 2021, mailed Nov. 2, 2022, 35 pgs.
Nister, David; Notice of Allowance for U.S. Appl. No. 17/356,337, filed Jun. 23, 2021, mailed Nov. 18, 2022, 5 pgs.
Asvadi, A., et al., "DepthCN: Vehicle Detection Using 3D-LIDAR and ConvNet", International Conference on Intelligent Transportation Systems (ITSC), IEEE, pp. 1-6 (Oct. 16, 2017), XP033330533.
Kim, W., S., et al., "Depth Map Coding with Distortion Estimation of Rendered View", Proceedings of Spie, vol. 7543, pp. 7430B1-75430B10, (Jan. 17, 2010), XP055272237.

(56) References Cited

OTHER PUBLICATIONS

Tateno, K., et al., "CNN-SLAM: Real-time dense monocular SLAM with learned depth prediction", Arxiv.Org, Cornell University Library, pp. 6243-6252 (Apr. 11, 2017).
International Preliminary Report on Patentability received for PCT Application No. PCT/US2019/061820, mailed on May 27, 2021, 9 pgs.
International Preliminary Report on Patentability received for PCT Application No. PCT/US2019/068766, mailed on Jul. 8, 2021, 10 pgs.
International Preliminary Report on Patentability received for PCT Application No. PCT/US2019/068764, mailed on Jul. 8, 2021, 12 pgs.
International Preliminary Report on Patentability received for PCT Application No. PCT/US2019/018348, mailed on Aug. 27, 2020, 16 pgs.
International Preliminary Report on Patentability received for PCT Application No. PCT/US2019/022753, mailed on Oct. 1, 2020, 14 pgs.
International Preliminary Report on Patentability International Patent Application No. PCT/US2019/012535 mailed Jul. 7, 2020.
International Search Report and Written Opinion mailed Apr. 15, 2020 in Application No. PCT/US2019/061820 filed Nov. 15, 2019.
International Search Report and Written Opinion mailed Nov. 7, 2019 in International Patent Application No. PCT/US2019/022753, 22 pgs.
International Search Report and Written Opinion mailed Oct. 17, 2019 in International Patent Application No. PCT/US2019/012535, 24 pgs.
International Search Report and Written Opinion mailed Jul. 25, 2019 in International Patent Application No. PCT/US2019/018348, 22 pgs.
International Search Report and Written Opinion mailed Jun. 26, 2019 in International Patent Application No. PCT/US2019/024400, 15 pgs.
International Search Report and Written Opinion mailed Aug. 26, 2019 in International Patent Application No. PCT/US2019/022592, 18 pgs.
Aude, E. P. L., et al., "Integration of intelligent systems and sensor fusion within the Controlab AGV", In Mobile Robots XIV, vol. 3838, pp. 50-62 (1999).
Bach, M., et al., "Multi-camera traffic light recognition using a classifying Labeled Multi-Bernoulli filter", IEEE Intelligent Vehicles Symposium (IV), pp. 1045-1051 (Jun. 2017).
Bidlack, C., et al., "Visual Robot Navigation using Flat Earth Obstacle Projection", Proceedings of The IEEE International Conference on Robotics and Automation, pp. 3374-3381 (1994).
Dynov, I., "Is Deep Learning Really the Solution for Everything in Self-Driving Cars? ", Retrieved from Internet URL : https://www.automotive-iq.com/autonomous-drive/articles/deep-learning-really-solution-everything-self-driving-cars, pp. 7 (2017).
Fazlollahtabar, H., et al., "Delay Optimization in a Multiple AGV System", International Journal of Swarm Intelligence and Evolutionary Computation, pp. 7 (2014).
Garnett, N., et al., "Real-Time Category-Based and General Obstacle Detection for Autonomous Driving", IEEE International Conference on Computer Vision Workshops, pp. 198-205 (2017).
Godard, C., et al., "Unsupervised Monocular Depth Estimation with Left-Right Consistency", IEEE Computer Society Conference on Computer Vision and Pattern Recognition, pp. 270-279 (2017).
He, L., et al., "Learning Depth from Single Images with Deep Neural Network Embedding Focal Length", Cornell University Library, pp. 1-14 (Mar. 27, 2018).
Jayaraman, A., et al., "Creating 3D Virtual Driving Environments for Simulation-Aided Development of Autonomous Driving and Active Safety", SAE Technical Paper, pp. 1-6 (2017).
Keighobadi, J., et al., "Self-Constructing Neural Network Modeling and Control of an AGV", Positioning, pp. 160-168 (2013).

Kendall, A., et al., "End-to-end Learning of Geometry and Context for Deep Stereo Regression", Cornell University Library, pp. 66-75 (2017).
Liu, H., et al., "Neural Person Search Machines", IEEE International Conference On Computer Vision (ICCV), pp. 493-501 (2017).
Muller, U., et al., "Off-Road Obstacle Avoidance Through End-To-End Learning". In Advances in neural information processing systems, pp. 1-8, (2006).
Neven, D., et al., "Towards end-to-end lane detection: an instance segmentation approach", In 2018 IEEE intelligent vehicles symposium (IV), pp. 7 (2018).
Pang, J., et al., "Cascade Residual Learning: A Two-Stage Convolutional Neural Network for Stereo Matching", IEEE International Conference on Computer Vision Workshops, pp. 887-895 (2017).
Pomerleau, D. A., "Alvinn: An Autonomous Land Vehicle In a Neural Network", In Advances in neural information processing systems, pp. 1-16, (1989).
Rothe, R., et al., "Non-maximum Suppression for Object Detection by Passing Messages Between Windows", ETH Library, pp. 1-17 (2015).
Schwarting, W., et al., "Planning and Decision-Making for Autonomous Vehicles", Annual Review of Control, Robotics, and Autonomous Systems, vol. 1, pp. 187-210, (2018).
Soylu, M., et al., "A self-organizing neural network approach for the single AGV routing problem", European Journal of Operational Research, pp. 124-137 (2000).
Stein, G. P., et al., "Vision-Based ACC With a Single Camera: Bounds on Range and Range Rate Accuracy", Proceedings of IEEE Intelligent Vehicle Symposium, pp. 1-6 (2003).
Suorsa, R., E., and Sridhar, B., "A Parallel Implementation of a Multisensor Feature-Based Range-Estimation Method", IEEE Transactions on Robotics and Automation, pp. 1-34 (1993).
Tao, A., "Detectnet: Deep neural network for object detection in digits", NVIDIA Developer Blog, Retrieved from Internet URL: https://devblogs.nvidia.com/detectnet-deep-neural-network-object-detection-digits/, accessed on Jul. 22, 2019, pp. 9 (2016).
International Preliminary Report on Patentability received for PCT Application No. PCT/US2019/016418, mailed on Aug. 13, 2020, 8 pages.
International Preliminary Report on Patentability received for PCT Application No. PCT/US2019/019656, mailed on Sep. 3, 2020, 11 pages.
International Preliminary Report on Patentability received for PCT Application No. PCT/US2019/024400, mailed on Oct. 8, 2020, 10 pages.
Weber, M., et al., "DeepTLR: A single deep convolutional network for detection and classification of traffic lights", IEEE Intelligent Vehicles Symposium (IV), pp. 8 (Jun. 2016).
Zhong, Y., et al., "Self-Supervised Learning for Stereo Matching with Self-Improving Ability", Cornell University Library, pp. 1-13 (2017).
Zitzewitz, G. V., "Survey of neural networks in autonomous driving", Survey of Neural Networks in Autonomous Driving, pp. 1-8 (2017).
"Conservative Control for Zone Driving of Autonomous Vehicles Using Safe Time of Arrival", United States U.S. Appl. No. 62/628,831, filed Feb. 9, 2018. ** Note: Copy not provided as part of PTO records.
"Convolutional Neural Networks to Detect Drivable Freespace for Autonomous Vehicles", U.S. Appl. No. 62/643,665, filed Mar. 15, 2018. ** Note: Copy not provided as part of PTO records.
"Deep Learning for Path Detection in Autonomous Vehicles", U.S. Appl. No. 62/684,328, filed Jun. 13, 2018 ** Note: Copy not provided as part of PTO records.
"Deep Neural Network for Estimating Depth from Stereo Using Semi-Supervised Learning", U.S. Appl. No. 62/646,148, filed Mar. 21, 2018. ** Note: Copy not provided as part of PTO records.
"Distance Based Ambient Occlusion Filter for Denoising Ambient Occlusions", U.S. Appl. No. 62/644,601, filed Mar. 19, 2018 ** Note: Copy not provided as part of PTO records.
"Energy Based Reflection Filter for Denoising Ray-Traced Glossy Reflections", U.S. Appl. No. 62/644,386, filed Mar. 17, 2018 ** Note: Copy not provided as part of PTO records.

(56) References Cited

OTHER PUBLICATIONS

"Geometric Shadow Filter for Denoising Ray-Traced Shadows", U.S. Appl. No. 62/644,385, filed Mar. 17, 2018. ** Note: Copy not provided as part of PTO records.
"Method and System of Remote Operation of a Vehicle Using an Immersive Virtual Reality Environment", U.S. Appl. No. 62/648,493, filed Mar. 27, 2018 ** Note: Copy not provided as part of PTO records.
"Methodology of Using a Single Controller (ECU) for a Fault-Tolerant/Fail-Operational Self-Driving System", U.S. Appl. No. 62/524,283, filed Jun. 23, 2017. ** Note: Copy not provided as part of PTO records.
"Methods for accurate real-time object detection and for determining confidence of object detection suitable for D autonomous vehicles", U.S. Appl. No. 62/631,781, filed Feb. 18, 2018. ** Note: Copy not provided as part of PTO records.
"Network Injection Rate Limiting", U.S. Appl. No. 62/648,326, filed Mar. 26, 2018 ** Note: Copy not provided as part of PTO records.
"Network Synchronization Using Posted Operation Tracking for Flush Semantics", U.S. Appl. No. 62/648,333, filed Mar. 26, 2018. ** Note: Copy not provided as part of PTO records.
"Programmable Vision Accelerator", U.S. Appl. No. 15/141,703, filed Apr. 28, 2016. ** Note: Copy not provided as part of PTO records.
"Pruning Convolutional Neural Networks for Autonomous Vehicles and Robotics", U.S. Appl. No. 62/630,445, filed Feb. 14, 2018 ** Note: Copy not provided as part of PTO records.
"Reliability Enhancement Systems and Methods" U.S. Appl. No. 15/338,247, filed Oct. 28, 2016. ** Note: Copy not provided as part of PTO records.
"System and Method for Autonomous Shuttles, Robo-Taxis, Ride-Sharing and On-Demand Vehicles", U.S. Appl. No. 62/635,503, filed Feb. 26, 2018. ** Note: Copy not provided as part of PTO records.
"System and Method for Controlling Autonomous Vehicles", U.S. Appl. No. 62/614,466, filed Jan. 17, 2018. ** Note: Copy not provided as part of PTO records.
"System and Method for Safe Operation of Autonomous Vehicles", U.S. Appl. No. 62/625,351, filed Feb. 2, 2018. ** Note: Copy not provided as part of PTO records.
"System and Method for Sharing Camera Data Between Primary and Backup Controllers in Autonomous Vehicle Systems", U.S. Appl. No. 62/629,822, filed Feb. 13, 2018 ** Note: Copy not provided as part of PTO records.
"System and Method for Training, Testing, Verifying, and Validating Autonomous and Semi-Autonomous Vehicles", U.S. Appl. No. 62/648,399, filed Mar. 27, 2018 ** Note: Copy not provided as part of PTO records.
"System and Methods for Advanced AI-Assisted Vehicles", U.S. Appl. No. 62/648,358, filed Mar. 26, 2018. ** Note: Copy not provided as part of PTO records.
"System and Methods for Virtualized Intrusion Detection and Prevent System in Autonomous Vehicles", U.S. Appl. No. 62/682,803, filed Jun. 8, 2018 ** Note: Copy not provided as part of PTO records.
"Systems and Methods for Safe and Reliable Autonomous Vehicles", U.S. Appl. No. 62/584,549, filed Nov. 10, 2017. ** Note: Copy not provided as part of PTO records.
"Video Prediction Using Spatially Displaced Convolution", U.S. Appl. No. 62/646,309, filed Mar. 21, 2018. ** Note: Copy not provided as part of PTO records.
"Detection of Hazardous Autonomous Driving Using Machine Learning," U.S. Appl. No. 62/622,538, filed Jan. 26, 2018. ** Note: Copy not provided as part of PTO records.
"Adaptive Occlusion Sampling of Rectangular Area Lights with Voxel Cone Tracing," U.S. Appl. No. 62/644,806, filed Mar. 19, 2018 ** Note: Copy not provided as part of PTO records.

Ching Y. Hung et al. "Programmable Vision Accelerator", States U.S. Appl. No. 62/156,167, filed on May 1, 2015 ** Note: Copy not provided as part of PTO records.
"Video Prediction Using Spatially Displaced Convolution", U.S. Appl. No. 62/647,545, filed in Mar. 23, 2018. ** Note: Copy not provided as part of PTO records.
Nister, David; First Office Action for Chinese Patent Application No. 201980001151.X, filed Jul. 29, 2019, mailed Dec. 12, 2023, 13 pgs.
Nister, David; Notice of Allowance for U.S. Appl. No. 18/083,159, filed Dec. 16, 2022, mailed Jan. 24, 2024, 11 pgs.
"Distance Based Ambient Occlusion Filter for Denoising Ambient Occlusions", U.S. Appl. No. 62/644,601, filed Mar. 19, 2018.
"Energy Based Reflection Filter for Denoising Ray-Traced Glossy Reflections", U.S. Appl. No. 62/644,386, filed Mar. 17, 2018.
"Geometric Shadow Filter for Denoising Ray-Traced Shadows", U.S. Appl. No. 62/644,385, filed Mar. 17, 2018.
"Method and System of Remote Operation of a Vehicle Using an Immersive Virtual Reality Environment", U.S. Appl. No. 62/648,493, filed Mar. 27, 2018.
"Methodology of Using a Single Controller (ECU) For a Fault-Tolerant/Fail-Operational Self-Driving System", U.S. Appl. No. 62/524,283, filed Jun. 23, 2017.
"Methods for accurate real-time object detection and for determining confidence of object detection suitable for D autonomous vehicles", U.S. Appl. No. 62/631,781, filed Feb. 18, 2018.
"Network Injection Rate Limiting", U.S. Appl. No. 62/648,326, filed Mar. 26, 2018.
"Network Synchronization Using Posted Operation Tracking For Flush Semantics", U.S. Appl. No. 62/648,333, filed Mar. 26, 2018.
"Programmable Vision Accelerator", U.S. Appl. No. 15/141,703 filed Apr. 28, 2016.
"Pruning Convolutional Neural Networks for Autonomous Vehicles and Robotics", U.S. Appl. No. 62/630,445, filed Feb. 14, 2018.
"Reliability Enhancement Systems and Methods" U.S. Appl. No. 15/338,247 filed Oct. 28, 2016.
"System and Method for Autonomous Shuttles, Robo-Taxis, Ride-Sharing and On-Demand Vehicles", U.S. Appl. No. 62/635,503, filed Feb. 26, 2018.
"System and Method for Controlling Autonomous Vehicles", U.S. Provisional U.S. Appl. No. 62/614,466, filed Jan. 17, 2018.
"System and Method for Safe Operation of Autonomous Vehicles", U.S. Appl. No. 62/625,351, filed Feb. 2, 2018.
"System and Method for Sharing Camera Data Between Primary and Backup Controllers in Autonomous Vehicle Systems", U.S. Appl. No. 62/629,822, filed Feb. 13, 2018.
"System and Method for Training, Testing, Verifying, and Validating Autonomous and Semi-Autonomous Vehicles", U.S. Appl. No. 62/648,399, filed Mar. 27, 2018.
"System and Methods for Advanced AI-Assisted Vehicles", U.S. Appl. No. 62/648,358, filed Mar. 26, 2018.
"System and Methods for Virtualized Intrusion Detection and Prevent System in Autonomous Vehicles", U.S. Appl. No. 62/682,803, filed Jun. 8, 2018.
"Systems and Methods for Safe and Reliable Autonomous Vehicles", U.S. Appl. No. 62/584,549, filed Nov. 10, 2017.
"Video Prediction Using Spatially Displaced Convolution", U.S. Appl. No. 62/646,309, filed Mar. 21, 2018.
"Detection of Hazardous Autonomous Driving Using Machine Learning," United States U.S. Appl. No. 62/622,538, filed Jan. 26, 2018.
"Adaptive Occlusion Sampling of Rectangular Area Lights with Voxel Cone Tracing," U.S. Appl. No. 62/644,806, filed Mar. 19, 2018.
Ching Y. Hung et al. "Programmable Vision Accelerator", U.S. Appl. No. 62/156,167, filed on May 1, 2015.
"Video Prediction Using Spatially Displaced Convolution", U.S. Appl. No. 62/647,545, filed in Mar. 23, 2018.
Chen, Chenyi; Final Office Action dated Feb. 8, 2022 in U.S. Appl. No. 16/366,875, 20 pgs.
Invitation to Pay Additional Fees received in PCT Application No. PCT/US2019/012535, mailed on Mar. 29, 2019, 15 pgs.

(56) References Cited

OTHER PUBLICATIONS

International Search Report and Written Opinion received in International Application No. PCT/US2019/016418, mailed on Apr. 10, 2019, 10 pgs.
Non-Final Office Action dated Oct. 7, 2021 U.S. Appl. No. 16/366,875, 22 pgs.
Notice of Allowance for U.S. Appl. No. 16/366,875, dated Apr. 22, 2022, 16 pgs.
Nister, David; Non-Final Office Action for U.S. Appl. No. 18/083,159, filed Dec. 16, 2022, mailed Dec. 15, 2023, 45 pgs.

* cited by examiner

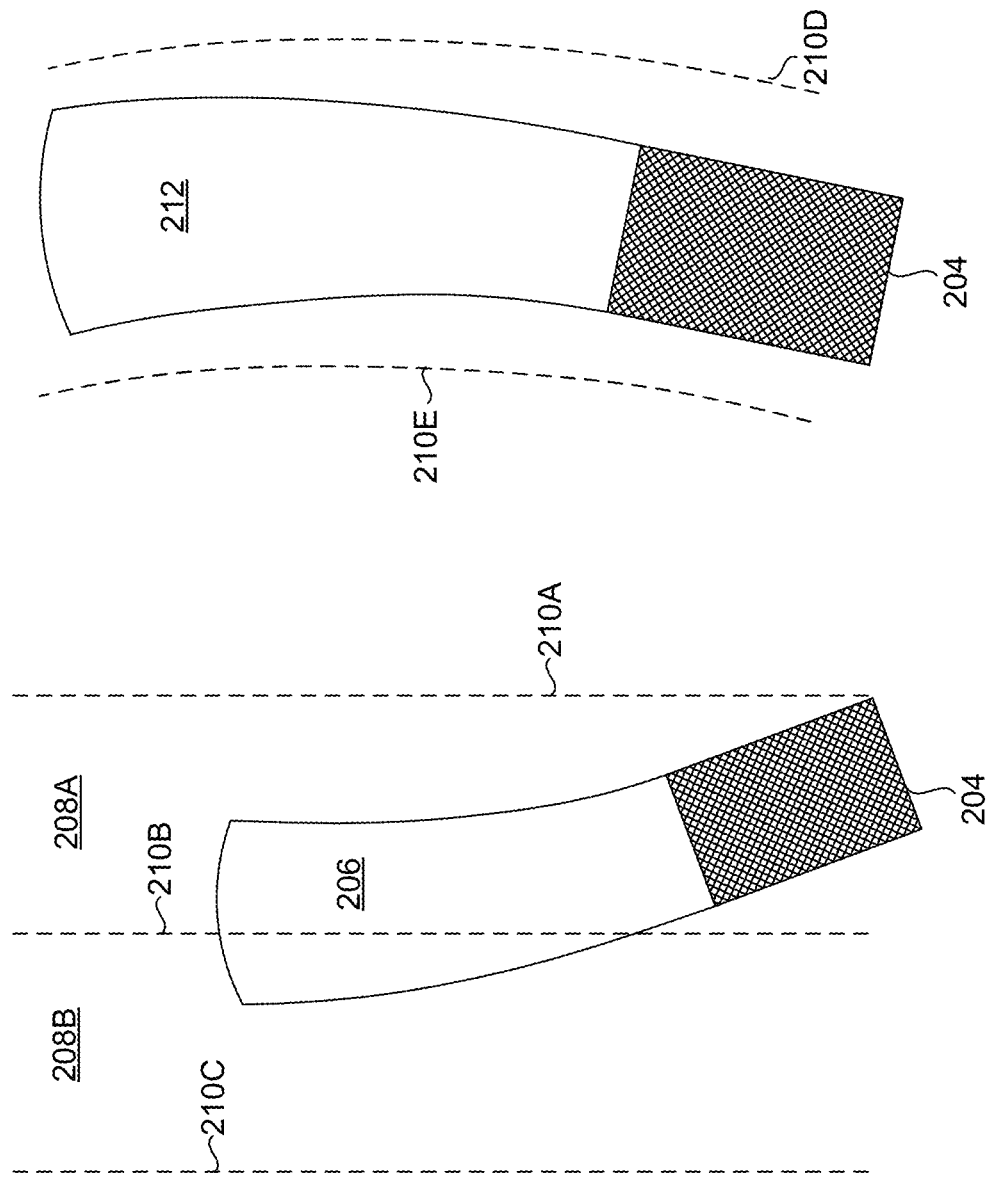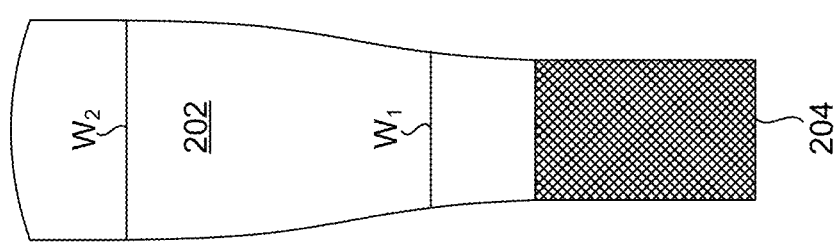

EFFICIENT SAFETY AWARE PATH SELECTION AND PLANNING FOR AUTONOMOUS MACHINE APPLICATIONS

CROSS-REFERENCE TO RELATED APPLICATIONS

This application is related to U.S. Provisional Application 62/978,309, filed on Feb. 19, 2020, and U.S. Non-Provisional application Ser. No. 16/265,780, filed on Feb. 1, 2019, each of which is hereby incorporated by reference in its entirety.

BACKGROUND

For autonomous vehicles to achieve autonomous driving levels 3-5 (e.g., conditional automation (Level 3), high automation (Level 4), and full automation (Level 5), as defined by the Society of Automotive Engineers standard J3016), the autonomous vehicles must be capable of operating safely in all environments, and without the requirement for human intervention when potentially unsafe situations present themselves. In order to meet this standard, obstacle and collision avoidance systems need to be implemented in the autonomous vehicles that do not contribute to or increase the likelihood or imminence of a collision (e.g., with another human operated vehicle, outside of the control of the autonomous vehicle). In addition, the obstacle and collision avoidance systems should be implemented in a way that feels natural to occupants of the autonomous vehicles, such that the autonomous vehicle does not execute harsh, abrupt, or erratic safety procedures unless needed to ensure the safety of the occupants.

In addition, in conventional systems, path selection may be executed to select a desired path from any number of potential paths for a vehicle. However, these conventional systems may not account for—or may inadequately account for—safety considerations when determining which path to select. For example, some conventional systems rely on safety determinations as an ancillary determination to the selection of a path. As such, once a path is selected, safety considerations may not be taken into account until the vehicle is traversing the environment according to the path. This approach may result in selections of paths that are unsafe from the outset and that may result in collision and/or erratic driving—or that may require activation of a safety maneuver to avoid a collision. Further, conventional systems may attempt to perform collision checks against every actor in the environment, in a higher dimensional space (e.g., three-dimensional (3D) space), and/or in a simulation that requires significant compute resources for execution. In addition, even where the compute resources are available, the execution of collision checks in this manner may render these conventional systems impractical for real-time applications—thereby eliminating their implementation in safety-critical applications such as path planning.

SUMMARY

Embodiments of the present disclosure relate to efficient safety aware path selection and planning for autonomous machine applications. Systems and methods are disclosed for weighting one or more optional paths based on obstacle avoidance considerations and/or other metrics or criteria such as comfort, progress, and/or conforming to rules of the road. In some embodiments, the obstacle avoidance considerations may be computed using a comparison of trajectories representative of safety procedures of an ego-vehicle and one or more other actors projected forward in time to ensure that each actor is capable of implementing their respective safety procedure while avoiding collisions. Where a particular path—or point along the path—does not satisfy this no collision standard, the path may be weighted more negatively with respect to the obstacle avoidance considerations.

As described herein, computing forward trajectories corresponding to safety procedures for each actor and at each time instance requires a significant amount of compute resources, and may affect the real-time implementation of the system. For example, it may be computationally infeasible to compute forward simulations over a future period of time and then to execute an intersection check for each ego-vehicle/actor pair where there are potentially hundreds of trajectories and/or hundreds of actors. As a result, in some embodiments, techniques may be leveraged to filter out one or more ego-vehicle/actor pairs from intersection checking based on relative state information of the pairs. By removing pairs from intersection checking, compute requirements and runtime of the system may be reduced. For ego-vehicle/actor pairs where intersection checking is executed, the computed forward trajectories of each of the actors may be converted from a three-dimensional space (e.g., two-dimensional (2D) space and one-dimensional (1D) time) to a 2D space by projecting the 3D forward trajectories onto a 2D plane. In addition, in some embodiments, the 2D forward trajectories may be defined or delineated by a boundary—rather than by each point in space occupied by the actor—such that intersection checks may be performed on an edge-by-edge basis. As a result of projecting the trajectories onto a 2D plane, and further performing edge-based intersection checks, the amount of compute resources required is reduced—thereby decreasing the runtime of the system for effective use in real-time or near real-time applications.

Once the intersection checks are completed for each potential or proposed path—or points thereon—weights may be attributed to the paths corresponding to a safety or collision avoidance aspect of an overall weight for the path. A path selector may then analyze the weights for each path to determine a best path for the vehicle through the environment. As a result, the efficient collision checking techniques described herein may be leveraged to aid in computing paths for vehicles that have been determined to be collision-free.

BRIEF DESCRIPTION OF THE DRAWINGS

The present systems and methods for efficient safety aware path selection and planning for autonomous machine applications are described in detail below with reference to the attached drawing figures, wherein:

FIGS. 2A-2C depict examples of two-dimensional projections of safety procedures for a vehicle, in accordance with some embodiments of the present disclosure;

DETAILED DESCRIPTION

Systems and methods are disclosed related to efficient safety aware path selection and planning for autonomous machine applications. Although the present disclosure may be described with respect to an example autonomous vehicle 900 (alternatively referred to herein as "vehicle 900" or "ego-vehicle 900", an example of which is described with respect to FIGS. 9A-9D, this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving systems, this is not intended to be limiting. For example, the systems and methods described herein may be used in a simulation environment (e.g., to more accurately simulate movement and control of objects in the simulation environment), in robotics, aerial systems, boating systems, and/or other technology areas, such as for path planning, obstacle avoidance, and/or other processes.

Figure 1:
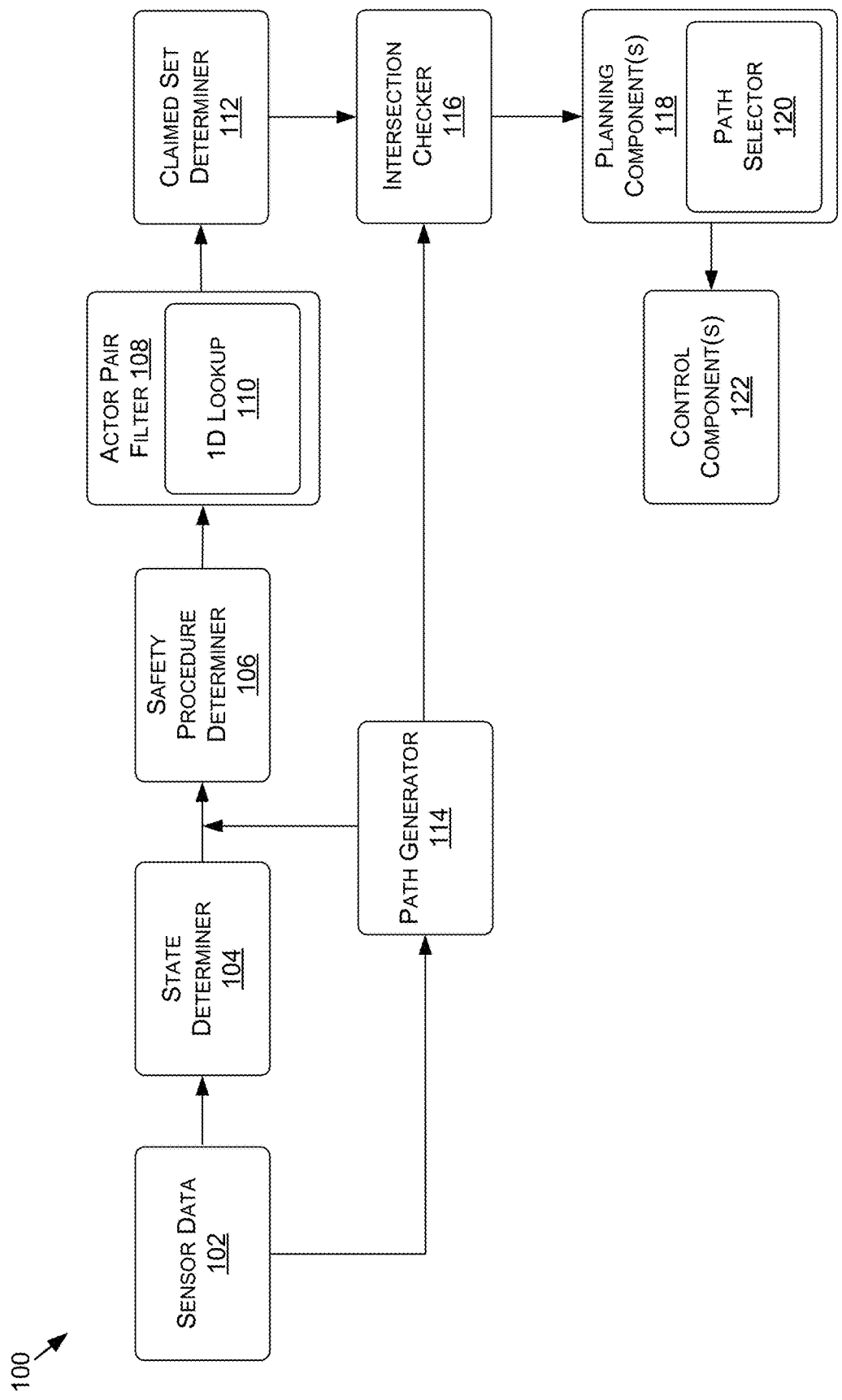
FIG. 1 includes an example data flow diagram for a process of path selection based on collision avoidance considerations, in accordance with some embodiments of the present disclosure.

With reference to FIG. 1, FIG. 1 includes an example data flow diagram for a process 100 of path selection based on collision avoidance considerations, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Figure 10:
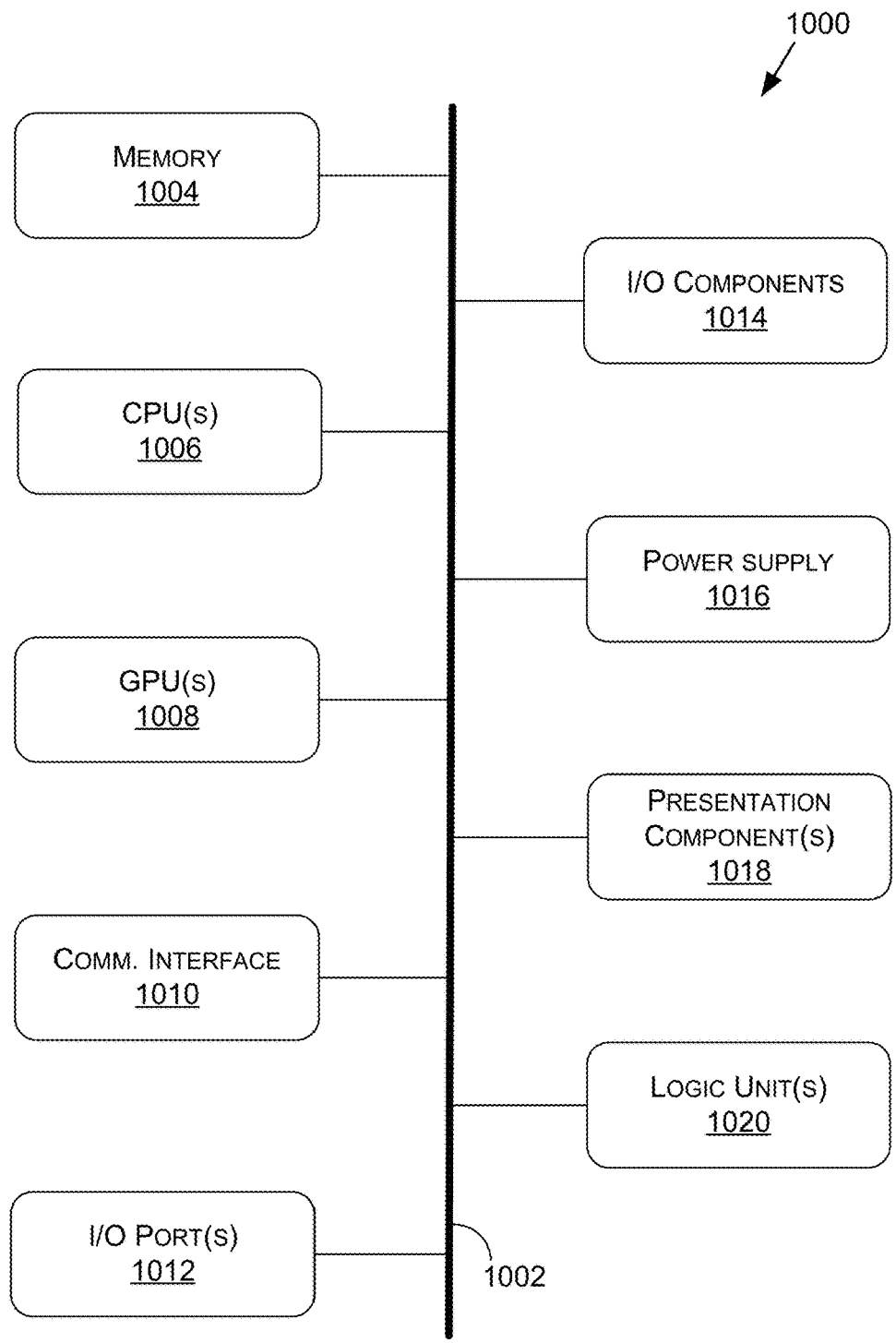
FIG. 10 is a block diagram of an example computing device suitable for use in implementing some embodiments of the present disclosure.

In some embodiments, operations executed by any of the various components of the system, such as intersection checks by an intersection checker 116 and/or claimed set projections by a claimed set determiner 112, may be executed in parallel using one or more parallel processing circuits (e.g., GPU(s)) of the vehicle 900, another object or vehicle, and/or by another device—such as a device including some or all of the components, features, and/or functionality of example computing device 1000 of FIG. 10).

The process 100 may include generating and/or receiving sensor data 102 from one or more sensors of the vehicle 900. The sensor data 102 may be used by the vehicle 900, and within the process 100, to determine potential paths for the vehicle 900, to determine claimed sets for the vehicle 900 and actors in the environment (e.g., other vehicles, pedestrians, bicyclists, etc.), to filter out actor pairs (e.g., a pair including the vehicle 900 and another actor), to generate trajectories for the vehicle 900 and the actors corresponding to the claimed sets over time, to generate projected trajectories from the trajectories, to perform intersection checks between the vehicle 900 and the actors, and/or to select a path from the potential paths. The sensor data 102 may include, without limitation, sensor data 102 from any of the sensors of the vehicle 900 (and/or other vehicles or objects, such as robotic devices, VR systems, AR systems, etc., in some examples). For example, and with reference to FIGS. 9A-9C, the sensor data 102 may include the data generated by, without limitation, global navigation satellite systems (GNSS) sensor(s) 958 (e.g., Global Positioning System sensor(s), differential GPS (DGPS), etc.), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900 and/or distance traveled), and/or other sensor types.

In some examples, the sensor data 102 may include the sensor data generated by one or more forward-facing sensors, side-view sensors, and/or rear-view sensors. This sensor data 102 may be useful for identifying, detecting, classifying, and/or tracking movement of objects around the vehicle 900 within the environment. In embodiments, any number of sensors may be used to incorporate multiple fields of view (e.g., the fields of view of the long-range cameras 998, the forward-facing stereo camera 968, and/or the forward facing wide-view camera 970 of FIG. 6B) and/or sensory fields (e.g., of a LIDAR sensor 964, a RADAR sensor 960, etc.).

The sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 may be used, at least in part, by a path generator 114 to generate one or more proposed paths for the vehicle 900 and/or predicted paths for actors or objects in the environment. For example, the path generator 114 may generate any number of paths for the vehicle 900, and the proposed paths may be analyzed—e.g., in view of safety or collision avoidance considerations, comfort considerations, consistency considerations, power/gas consumption considerations, conforming to rules of the road, etc.—to determine which path to select as the actual path of the vehicle 900. One such consideration, the safety or collision avoidance consideration, may factor in to the final determination of a path for the vehicle 900. This consideration may be used to filter out paths, penalize (e.g., apply or attribute a negative or lower weight value to) paths where collision or possible collision events are predicted between the vehicle 900 and one or more actors, reward (e.g., apply or attribute a positive or higher weight value to) paths where an absence of a collision or possible collision event is predicted, penalize and/or reward paths based on who is at fault (e.g., a path may be penalized more when the ego-vehicle 900 would be at fault but less penalized when the other actor would be at fault), penalize and/or reward based on how early or late a collision occurs in the proposed path (e.g., if a collision occurs more immediately, such as within first couple of time steps, then the path would be penalized more, and if a collision occurs further into path, such as at a final time step, then the path would be penalized less), and/or the like.

For example, given a set of N trajectory or path candidates that are sampled at T consecutive future time-steps (or time stamps)—as represented by equation (1), below—the goal may be to identify all such trajectories, $t_i$, that would have a potential collision or collision event (e.g., a safety force field event).

$$\{p_i(0), p_i(1) \ldots p_i(T-1)\}_{i<N} \quad (1)$$

A potential collision or collision event may include events where claimed sets—as defined herein, for example—overlap at some future time stamp t<T Using this information, a path selector 120 of a planning component(s) 118 (e.g., a motion planner) of an autonomous driving software stack may determine which final path for the vehicle 900 to follow. This may require that predictions for all M obstacles (e.g., actors, objects, etc.) at the same time stamps be computed, as denoted by equation (2), below:

$$\{q_j(0), q_j(1) \ldots q_j(T-1)\}_{j<M} \quad (2)$$

Each trajectory point, $p_i(t)$, $q_j(t)$, may represent a pose of the actor—e.g., position, velocity, acceleration, orientation, curvature, diameter, uncertainty, and/or other pose or state information—at the time, t.

Since at each of the time steps, t<T, occupied trajectories may need to be computed, and because this computation involves simulation over some future period of time, t≤z≤t+$t_{stop}$, during which both the vehicle 900 and the actor perform a respective safety procedure, this computation may require enough compute resources that real-time or near real-time execution may be infeasible. Furthermore, because the intersection checks between occupied trajectories of actors may occur in three-dimensional (3D) space (e.g., two-dimensional (2D) space, one-dimensional (1D) time), and because the intersections checks may be required for hundreds or thousands of possible trajectories and with respect to hundreds or thousands of possible actors, the feasibility of real-time or near real-time execution of collision checking may not be practical. As a result, systems and methods described herein may perform filtering of certain actors from consideration (e.g., using an actor pair filter 108) and/or may perform intersection checking on a projected—2D—version of the occupied trajectory. In addition, for the intersection checking, the 2D projected trajectories may be represented and analyzed based on edges of the projected trajectory (e.g., by performing edge to edge intersection checks of projected trajectories of the vehicle 900 against projected trajectories of actors), thereby further reducing the intersection checking compute requirements as compared to performing intersection checking over each of the points in space-time corresponding to an occupied trajectory.

To generate the projected trajectories for each of the actors—including the vehicle 900—approaches described in U.S. Non-Provisional application Ser. No. 16/265,780, filed on Feb. 1, 2019, which is hereby incorporated by reference in its entirety, may be applied or implemented.

For example, a state determiner 104 may determine a state of the actors (e.g., the vehicle 900 and other objects, static or dynamic) in the environment. The state of each actor may generally include a location, a speed, a direction (e.g., direction of travel), a velocity, an acceleration(s) (e.g., scalar, rotational, etc.), a pose (e.g., orientation) and/or other information about the state of the actors. The state may encode or represent the position of the actor in two-dimensional space (e.g., (x, y) coordinates), a unit direction of the actor, and/or a scalar velocity of the actor at a point in time. In some examples, the state may encode or represent additional or alternative information, such as rotational velocity (e.g., yaw) and/or scalar acceleration in any direction. For example, a state, $x_A$, for each actor, may be parameterized as an m-dimensional state vector, represented as follows, in equation (3):

$$x_A(t) \in \mathbb{R}^m \quad (3)$$

As an example, such as where the state, $x_A$, is a five-dimensional vector (e.g., m=5), the state vector may be represented as follows, in equation (4):

$$x_A = [y^T d^T v]^T \quad (4)$$

where y is the position of the actor in two-dimensional space, d is a unit direction vector, and v is a scalar velocity.

For each actor, when the state of the actor is viewed as a function of time, a vector may represent a state trajectory, $X_A$, of the actor (e.g., the state trajectory, $X_A$, may represent or encode each state, $x_A$, of the actor at each time within a period of time). The state trajectories may be determined for each of the actors by the state determiner 104, and the collection of the states (e.g., at any one time) and/or the collection of the state trajectories (e.g., as a function of time) may include a set of state spaces or state trajectories for all actors in the environment.

The state determiner 104 may determine the state of the vehicle 900 using any combination of sensors, such as the GNSS sensors 958, the IMU sensor(s) 966, the speed sensor(s) 944, the steering sensor(s) 940, etc. The state determiner 104 may determine and/or infer the state of the objects in the environment—e.g., other than the vehicle 900—using any combination of the stereo camera(s) 968, the wide-view camera(s) 970, the infrared camera(s) 972, the surround camera(s) 974, the long range and/or mid-range camera(s) 998, the LIDAR sensor(s) 964, the RADAR sensor(s) 960, the microphone(s) 996, the ultrasonic sensor(s) 962, and/or other sensors of the vehicle 900. In some examples, the state of the objects (e.g., when one or more of the objects is another vehicle, or a person using a client device capable of wireless communication) may be determined using wireless communications, such as vehicle-to-vehicle communication, or device-to-vehicle communication, over one or more networks, such as, but not limited to, the network(s) described herein.

In some examples, machine learning models, such as neural networks (e.g., convolutional neural networks), may be used to determine the states of the actors. For example, sensor data from the sensors of the vehicle 900 may be applied to one or more machine learning models in order to aid the vehicle 900 in determining the state of the objects in the environment. For example, the autonomous vehicle 900 may be configured to quickly and efficiently execute neural networks, on processed and/or unprocessed data for a variety of functions. For example, and without limitation, a convolutional neural network may be used for object detection and identification (e.g., using sensor data from camera(s) of the vehicle 900), a convolutional neural network may be used for distance estimation (e.g., using the sensor data from the camera(s) of the vehicle 900), a convolutional neural network may be used for emergency vehicle detection and identification (e.g., using sensor data from the microphone(s) of the vehicle 900), a convolutional neural network may be used for facial recognition and vehicle owner identification (e.g., using the sensor data from the camera(s) of the vehicle 900), a convolutional neural network may be used for identifying and processing security and/or safety related events, and/or other machine learning models may be used. In examples using convolutional neural networks, any type of convolutional neural networks may be used, including region-based convolutional neural networks (R-CNNs), Fast R-CNNs, and/or other types. In addition to or alternatively from CNNs, any type of machine learning model may be implemented, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Once the state of the actors is determined, a control model may be determined for the actors (e.g., by the safety procedure determiner 106). For example, a control model may be represented as follows, in equation (5):

$$\frac{dx_A}{dt} = f(x_A, t, c) \quad (5)$$

As such, the control model for an actor may represent a derivative of the state of the actor, $x_A$, with respect to time, t, and control parameter(s), c. The control model may be formulated locally as an explicit differential equation with control parameter(s), c, that may model user input, such as steering, braking, and acceleration. For example, in some examples, the control model for an actor may be expressed according to equation (6), below:

$$\frac{dx_A}{dt} = [vd^T \, vbd_\perp^T \, a]^T \quad (6)$$

where v is a scalar velocity, d is unit direction vector, a is a scalar acceleration amount, b is a scalar steering parameter, and $d_\perp$ s the perpendicular to d, generated by flipping the coordinates of d and negating the first coordinate. In the example of equation (4), the control parameters may be a, the scalar acceleration amount, and b, the scalar steering parameter.

Once the control model is determined, a control policy may be determined (e.g., by the safety procedure determiner 106). For example, the control parameters may be a function of the world state, $x_w$ (or a perception of the world state based on the sensor data generated by the sensors of the vehicle 900), and time, t. As such, a control policy may be a function of the joint state space of the world and time into $\mathbb{R}^m$ (where m is the dimension of the state space of the actor) that is smooth and bounded. For example, a control policy may be represented as follows, in equation (7):

$$\frac{dx_A}{dt} = f(x_w, t) \quad (7)$$

Once the control policy is determined, a safety procedure may be determined for each actor (e.g., by the safety procedure determiner 106). For example, as described herein, each actor may be assumed to have a safety procedure, $S_A$. The safety procedure may have an associated trajectory(ies) derived from any starting state, $x_A$, of the actor. The safety procedure may represent the trajectory(ies) of the actor as the actor transitions form the state, $x_A$, to an actor state objective (e.g., a final location, where the actor may come to a stop). The actor state objective may be determined, in some examples, by analyzing sensor data received from one or more sensors (e.g., of the vehicle 900) to determine locations, orientations, and velocities of objects (or other actors) in the environment. Control parameters (e.g., for steering, braking, accelerating, etc.), as described herein, may then be determined for the actors (e.g., the vehicle 900 and/or the objects), and a set of functions to guide the actor to the actor state objective may be determined.

The safety procedure may result in a trajectory(ies) that changes smoothly with its starting state (e.g., because the safety procedure may be a continuous deceleration to a stop). In some examples, a safety procedure, $S_A$, may be represented as follows, in equation (8):

$$S_A = \left\{ \frac{dx_A}{dt} = f(W, t) \right\} \quad (8)$$

where W represents properties of the world (or environment). The safety procedure for an actor may or may not depend on fixed properties of the world, depending on the embodiment. For example, the safety procedure may not depend on the fixed properties of the world, such as road shape or a map. In such an example, the safety procedure may include freezing a direction vector (e.g., by setting a scalar steering parameter, b, to zero), and coming to a complete stop by slowing down by a range of acceleration values [$a_{min}$, a'] (where $a_{min}$ is minimum acceleration amount or the negative of a maximum braking amount, and a' is a negative value larger than $a_{min}$), to a complete stop. This type of safety procedure, $S_A$, may be represented by equation (9), below:

$$S_A = \left\{ \frac{dx_A}{dt} = [vd^\top \ 0 \ a]^\top : a_{min} \le a \le a' \right\} \quad (9)$$

In any example, the safety procedure may include braking until reaching a complete stop. At high speeds, without limitation, the safety procedure may include lining up with a current lane (or with the direction of the road, such as when the vehicle 900 is in the middle of a lane change), and then coming to a complete stop (and thus may depend on fixed properties of the world, such as lane markings). For example and without limitation, at low speeds, the safety procedure may include the vehicle 900 steering itself to a side of the road as it decelerates to a stop (and thus may depend on the fixed properties of the world). For example, one or more neural networks (e.g., convolutional neural networks) may be used to identify the side of the road and/or to aid in maneuvering the vehicle 900 to the side of the road. As another example, an HD map 922 and/or another map type may be used. In such an example, the HD map 922 may be received over a network(s) 990 and/or may be embedded in the vehicle 900.

In yet another example, the safety procedure may be modified to provide for a certain level of comfort (e.g., maximum comfort) for the passengers of the vehicle (e.g., minimum deceleration or directional change) while still guaranteeing avoidance of a collision. In such an example, a course, trajectory, and/or control sequence may be determined for the vehicle 900, as the safety procedure, that maximizes comfort and/or minimizes force exerted on passengers while still ensuring that a collision with other objects (e.g., vehicles, entities, structures, etc.) is avoided. In some examples, such as where a collision is unavoidable or a likelihood of collision is above a threshold risk level, the safety procedure may be modified to minimize the risk of harm to the passengers in the vehicle and other entities should a collision occur.

Examples of safety procedures are illustrated with respect to FIGS. 2A-2C. For example, with respect to FIG. 2A, a safety procedure 202 may include an actor 204 (or a shape representing the actor 204, such as a subscribed rectangle or polygon) coming to a complete stop while maintaining a low or zero lateral rate of change. For example, in an unstructured environment, or when ignoring fixed properties of the world, the safety procedure 202 may include driving straight ahead and/or continuing along the current steering circle (which may or may not include a lateral rate of change) until the actor 204 comes to a complete stop. For example, if the actor is currently steering at a steering angle to the right, the safety procedure 202 may include continuing at the steering angle until a complete stop is reached. If the actor is currently steering straight, the safety procedure 202 may include continuing straight until a complete stop is reached (e.g., as illustrated in FIG. 2A).

In any example, the safety procedures for any actor may include a safety margin (e.g., in addition to, or alternatively from, the safety margin described herein with respect to a size of the actor). For example, with respect to the safety procedure 202, as time increases in space-time from the time associated with a current state of the actor, the safety margin for the safety procedure may increase. For example, with respect to the safety procedure 202, a width, $W_1$, of the claimed set of the safety procedure 202 may be less than a width, $W_2$, of the claimed set of the safety procedure 202. In such an example, because the width, $W_1$, may correspond to an earlier time, there may be less margin for error as compared to the time associated with the width, $W_2$. As a result, the safety margin may increase over space-time to account for this error.

As another example, a safety procedure 206 may include the actor 204 (or the shape representing the actor 204), during a lane change from a first lane 208A to a second lane 208B, aligning itself with the road (e.g., aborting the lane change and lining up with the direction of the road, such as parallel with lane markings 210A, 210B, and/or 210C), and coming to a complete stop. In such an example, the safety procedure may account for the fixed properties of the world (e.g., the lane markings, the direction of the road, etc.). The safety procedure 206 may be determined in order to minimize the lateral rate of change (e.g., with respect to the road shape) while still aborting the lane change and realigning the actor 204 with the road.

As a further example, and with respect to FIG. 2C, a safety procedure 212 may include the actor 204 (or the shape representing the actor 204), following the road shape to accommodate for curves in the road and coming to a complete stop. For example, if the actor 204 is already following the road shape, and thus accounting for the fixed properties of the world, the safety procedure 212 may include continuing to follow the road shape (e.g., as defined by the lane markings 210D and 210E). Similar to the safety procedure 206, the safety procedure 212 may be determined in order to minimize the lateral rate of change while continuing to follow the road shape.

An actor pair filter 108 may be used to filter out pairs including an actor and the ego-vehicle 900 at a single time step, at multiple time steps, and/or at each time step. For example, a path of each actor in combination with each path of the ego-vehicle 900 may be compared by the actor pair filter 108—as described in more detail herein with respect to FIG. 6. The actor pair filter 108 may filter out paths of actors, points along paths of actors, paths of the ego-vehicle, and/or points along paths of the ego-vehicle 900 based on spatial relationships. The spatial relationships may include lateral (left-right) and/or longitudinal (forward-back) spatial relationships such as where a path of an actor—or points thereon—are greater than a threshold distance from paths of the ego-vehicle 900—or points thereon. For example, a lateral distance threshold may include a radius centered at a point on the ego-vehicle 900. The radius may be, as a non-limiting example, one and a half, twice, three times, etc. the distance that it takes for the ego-vehicle and/or the actor to come to a stop when executing their respective safety procedures. For example, at each time instance corresponding to the paths, a circle or sphere having a radius of twice the stopping distance of the actor may be generated for the actor and another circle or sphere having a radius twice the stopping distance of the ego-vehicle 900 may be generated for the ego-vehicle 900. If the two spheres do not intersect or overlap, then the points of the paths of the actor and the ego-vehicle 900 may be filtered out. Where this condition holds true for one or more time instances, the actor may be filtered out with respect to the particular path at the one or more time instances—e.g., because the determination may be that no collision can occur at one or more time instance of the paths, the actor may be filtered out from intersection checking using the projected trajectories at one or more of the time instances.

In addition, the actor pair filter 108 may filter out actors (or a path(s) corresponding thereto) that are traveling in an opposite direction of the ego-vehicle 900 and have already passed the ego-vehicle 900. For example, for each time instance corresponding to a path of the actor, if the location of the actor is behind a location of the ego-vehicle 900 at the same time instance, and the actor is traveling in an opposite direction as the ego-vehicle 900, the point on the path may be filtered out from consideration.

Further, the actor pair filter 108 may filter out actors (or a path(s) corresponding thereto) that are separated by some occlusion or barrier, such as a cement divider, trees, curbs, sidewalks, and/or the like. In some embodiments, actors may be filtered out where they are blocked or occluded by other actors at any time instance—e.g., where a first actor is blocked by a second actor, the actor pair filter 108 may filter out the first actor and instead only consider the second actor for intersection checking.

In some embodiments, the actor pair filter 108 may filter out paths of actors or points thereon that satisfy a lead-follow relationship. For example, during an entire safety procedure corresponding to a time instance, one actor is always in front of the other. The distance in front of the other may include an exact distance or may include a distance plus a safety margin or gap (e.g., one actor is always ahead of the other during their respective safety procedures by at least four feet, five feet, ten feet, etc.). For example, for a given (longitudinal) distance and a given (longitudinal) speed of an actor, there is a—potentially empty—interval of safe speeds, {$speed_{min}$, $speed_{max}$}, at which the ego-vehicle 900 may drive while impossible to reach (plus a fixed minimum longitudinal safety margin or gap, in embodiments) or surpass the actor in a finite amount of time. As such, given each actor location, size, and/or speed, a 1D lookup 110 may be used to look up the speed interval that the ego-vehicle should have to be eliminated due to a lead-follow relationship when both the actor and the ego-vehicle 900 execute their respective safety procedures.

Figure 4:
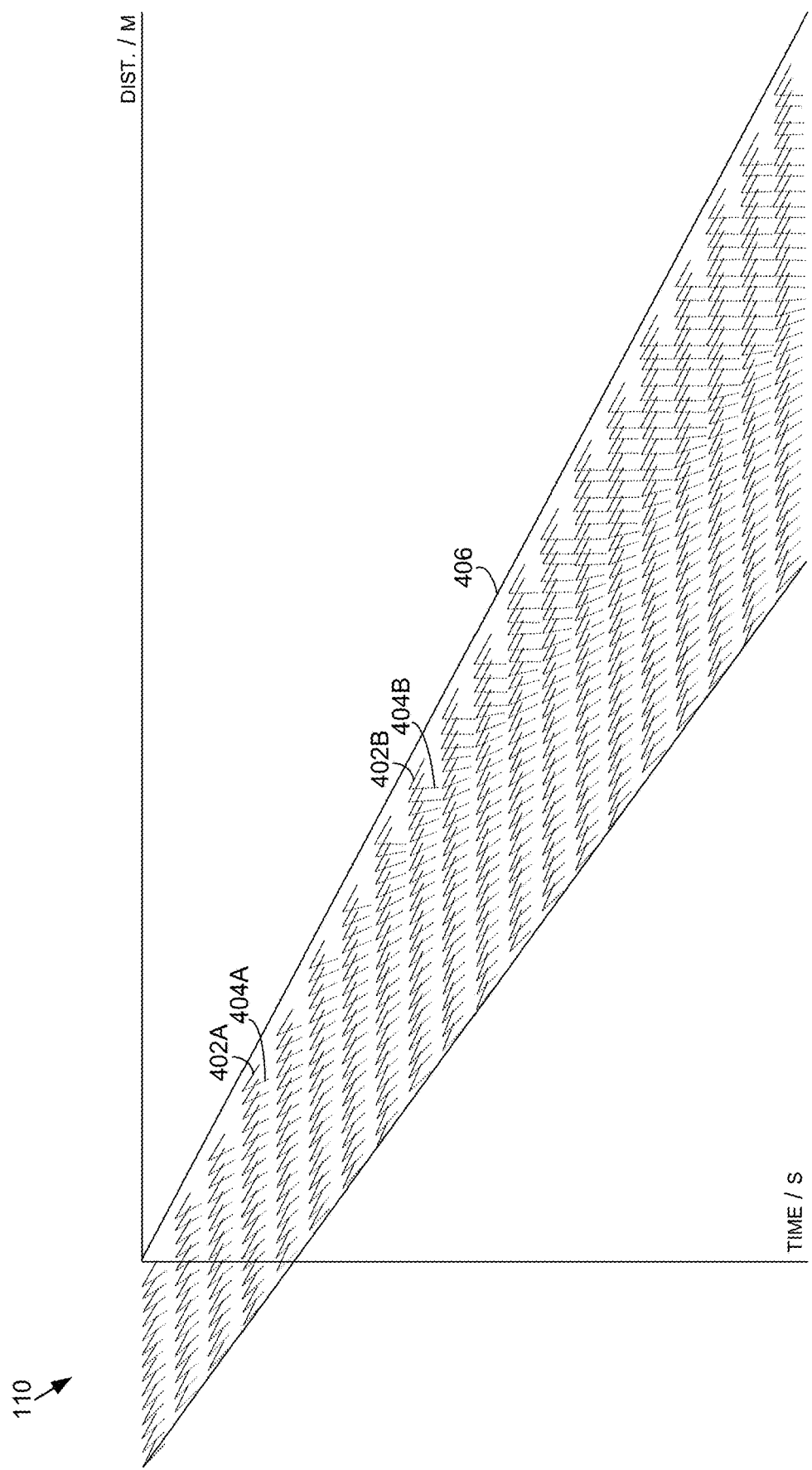
FIG. 4 depicts an example speed vector field lookup table for filtering out lead follow pairs of actors, in accordance with some embodiments of the present disclosure.

As an example, and with respect to FIG. 4, the longitudinal information may be projected into a distance vs. time space or plot (the illustration of FIG. 4 includes a single instance or visualization of the 1D lookup 110 based on a single query state). A front actor and a rear actor may form a speed vector field given the predicted positions and speeds (e.g., assuming, in embodiments, a constant velocity extrapolation). Vectors 402A (e.g., 402A and 402B) may indicate $speed_{max}$ and vectors 404 (e.g., 404A and 404B) may indicate $speed_{min}$ of the query state. Every vector 402 and 404 may start from a state which encodes the query status (e.g., position, speed, and acceleration) and the slope of the vectors may indicate a speed vector (e.g., in distance vs. time coordinate space). As such, given a query status of a predicted state of an actor—e.g., via the state determiner 104—a relative distance (e.g., between the actor and the ego-vehicle 900), and the actor's predicted speed, $v_{object}$, to calculate the values for the interval of safe speeds. As an example, the speed upper limit, $speed_{max}$, may become a function as defined in equation (10A), below:

$$speed_{max} = f(d_{relative\_front}, v_{object}, a_{query})\qquad(10A)$$

where $a_{query}$ is the acceleration of the ego-vehicle 900 and $d_{relative\_front}$ is the relative distance to an actor in front of the ego-vehicle 900. Similarly, as another example, the speed lower limit, $speed_{min}$, may become a function as defined in equation (10B), below:

$$speed_{min} = f(d_{relative\_rear}, v_{object}, a_{query})\qquad(10B)$$

where $d_{relative\_rear}$ is the relative distance to an actor to the rear of the ego-vehicle 900. As such, the 1D lookup may use the relative distance between the actor (e.g., an actor to a front or rear of the ego-vehicle 900) and the ego-vehicle 900, the speed of the actor, and the acceleration of the ego-vehicle 900 to look up one value from the interval of safe speeds.

As an example, assuming that a value for $speed_{max}$ is desired at time=3 seconds, distance=10 meters, and $a_{query}$=0.5 meters/second/second, the front actor's state may first be predicted at time=3 seconds (assume the results are distance=25 meters and $v_{object}$=18 meters/second), the prediction of the front actor's state may be plotted as line 406. The $distance_{relative\_front}$ may then be computed at time=3 seconds to be 15 meters (e.g., 25 meters-10 meters). This value may then be used in addition to $v_{object}$ and $a_{query}$ to perform a lookup in the 1D lookup—or the instance thereof generated using the values, {15 meters, 18 meters/second, 0.5 meters/second/second} to land on a state—e.g., a vector 402—that corresponds to the values. The $speed_{max}$ may then be determined from the vector 402 and the velocity of the ego-vehicle 900 may be compared to the $speed_{max}$, and where the velocity of the ego-vehicle 900 is less than the $speed_{max}$, the path or point thereon of the actor may be filtered out by the actor pair filter 108.

The 1D lookup 110 may be constructed with all of the different combinations of the query state's elements. As such, if the ego-vehicle 900 obeys the speed vector field from the 1D lookup 110, a collision free future would be guaranteed given the presumed operational limits of the actor and the ego-vehicle 900. The calculation of the function—e.g., as in equations (10A) and (10B)—may include an analytical solution or a brute force forward simulation search based method (e.g., utilizing CUDA code on one or more GPUs).

As a result, the 3D intersection problem with occupied trajectories, described herein, is reduced to a 1D lookup, which is more efficient to solve. In some embodiments, the 1D lookup 110 and the various query states may be pre-computed (e.g., offline, at initialization, etc.) and stored in the 1D lookup table for common deceleration parameters of the safety procedure. Although a single 1D lookup 110 is described herein, this is not intended to be limiting. For example, different 1D lookups may be computed for different actor types and/or different safety procedures. As such, a first 1D lookup may be computed and accessed for cars (e.g., sedans, SUVs, etc.) while a second 1D lookup may be computed and accessed for trucks (e.g., 18-wheelers, garbage trucks, etc.).

After filtering by the actor pair filter 108, there may be some number of actors remaining in the environment that may undergo intersection checking. As such, once the safety procedure is determined for each of these actors, a claimed set determiner 112 may determine a claimed set of the vehicle 900 and the actors (or objects) in the environment. The claimed set for an actor may include an occupied trajectory (e.g., each of the points in space that the actor occupied when following a trajectory) of an actor when the actor applies its safety procedure, $S_A$, starting from state, $x_A$.

In order to determine the claimed set, the claimed set determiner 112 may determine an area and/or volume in space occupied by the actor given its state. For example, it may be assumed that actors move around in and occupy n-dimensional real space, $\mathfrak{R}^n$. In some examples, for simplicity, a two-dimensional (2D) space modeling a top-down view of the real world may be used. In other examples, a three-dimensional (3D) space may be used. In any example, in order to determine the claimed set, the vehicle 900 may first determine occupied sets of each actor (e.g., including the vehicle 900), representing a set of points in space that the actor occupies as a function of its state. The occupied set, $o_A$, for an actor may be determined as follows, in equation (11), below:

$$o_A(x_A) \subseteq \mathbb{R}^n \quad (11)$$

If a point in space is in the occupied set of the actor, the actor may be determined to occupy the point.

In order to determine each of the points in the occupied set, a size (e.g., an actual size of the actor) or representative size (e.g., a shape around and/or including the actor) of the actor may be determined. In some examples, the size or representative size may include an optional safety margin. With respect to the vehicle 900, the size of the vehicle 900 may be known (e.g., based on calibration information, vehicle information, vehicle make and model, and/or other parameters). With respect to the objects in the environment, the size of the objects may be determined using the sensors of the vehicle 900 and sensor data therefrom, and/or one or more machine learning models (e.g., convolutional neural networks). In some examples, for determining the size of the actors (e.g., the vehicle 900 and the objects), a shape (e.g., a predefined or subscribed shape, such as a square, polygon, bounding box, cube, circle, oval, ellipse, etc.) may be fit around the actor (e.g., to at least include the actor) and the size of the actor may be determined to be the size of the predefined shape (e.g., including a safety margin, in some examples, as described herein). For example, the shape may be a 2D shape (e.g., a rectangle or circle), that serves as a bounding box that encircles the actor at least partially. In other examples, the shape may be a 3D shape (e.g., a cube) that serves as a bounding cube that encircles the actor at least partially. In any example, the size of the vehicle may be used by the claimed set determiner 112 to determine the points (e.g., (x, y) coordinates) in space that the actor occupies as part of the occupied set, $o_A$.

In some examples, the size of the actor, and thus the representative shape corresponding to the size of the actor, may be determined such that the size and/or shape fully include the actor, at least in two-dimensions (e.g., laterally and longitudinally). By fully including the actor (with an additional safety margin, in examples), it may be more likely that the occupied set, the occupied trajectory, and thus the claimed set more accurately represent the actual points in space that the actor would occupy when executing the safety procedure.

Once the occupied set is determined, the claimed set determiner 112 may determine the occupied trajectory(ies), $O_A$, of each actor. The occupied trajectory(ies) may include the set of points in space-time that the actor will occupy over time as a function of its trajectory(ies). For example, the occupied trajectory(ies), $O_A$, may be determined as follows, in equation (12), below:

$$O_A(X_A) = \{(y,t): y \in o_A(x_A(t)), t \in T\} \subseteq \mathbb{R}^n \times T \quad (12)$$

The occupied trajectory(ies), when applying the safety procedure, $S_A$, of the actor may include the claimed set, $C_A$. Any points determined to be within the claimed set of an actor are points in space-time that the actor may require to maintain the integrity of its safety procedure. Thus, when looking at multiple actors in the environment, the vehicle 900 may analyze each of the claimed sets of the actors to determine if any intersection occurs between them. When an intersection occurs, one or more actions may be taken to account for the intersection (e.g., the safety procedure may be implemented, another action may be implemented, etc., as described herein). The claimed set, $C_A$, may be determined as follows, in equation (13), below:

$$C_A(x_A) \subseteq \mathbb{R}^n \times T \quad (13)$$

where equation (10) may represent the occupied trajectory(ies) of the actor that results if the actor applies its safety procedure starting from state, $x_A$. In some examples, as described herein, the claimed set may represent a combination or aggregation of each of the occupied trajectories that result from applying the actor's safety procedure with different parameters. For example, the safety procedure may be applied with a maximum braking profile, a minimum braking profile, a braking profile in between the maximum and minimum, a maximum steering profile, a minimum steering profile, a steering profile in between the maximum and minimum, and/or in other ways. In such examples, the claimed set may include the occupied trajectories for any number of different applications (e.g., for each different application) of the safety procedure, combined or aggregated.

As a first example, the claimed set may represent the safety procedure with a first braking profile for coming to a complete stop more quickly than a second braking profile, and may represent the safety procedure with the second braking profile for coming to a complete stop more slowly (e.g., than the first braking profile) while still avoiding a collision. In such an example, thresholds or bounds may be set and/or determined to define the first braking profile (e.g., a defined maximum or upper bounded braking profile) and the second braking profile (e.g., a defined minimum or lower bounded braking profile). In such an example, the claimed set may represent each of the points in space-time occupied by the actor by the safety procedure applied with the first braking profile, the second braking profile, and the points in space-time occupied by the actor that fall between first and second braking profiles (e.g., as illustrated in and described with respect to FIG. 3C). Depending on the specific embodiment, the thresholds or bounds for generating the claimed set may be different.

The thresholds or bounds may be defined, without limitation, based on percentages (e.g., braking intensity percentages) and/or time (e.g., time to come to a complete stop, such as based on a current speed or velocity). For example, the first braking profile may include a 95% braking intensity and the second braking profile may include an 85% braking intensity. As another example, if the vehicle 900 is traveling sixty miles per hour (mph), the first braking profile may include coming to a stop within three seconds (e.g., slowing down by an average of twenty mph per second), while the second braking profile may include coming to a stop within four seconds (e.g., slowing down by an average of fifteen mph per second). To determine the time, a factor of speed may be used in some examples. In such examples, the first braking profile may include one second for every ten mph the vehicle 9 is traveling based on a current state, $x_A$, of the vehicle 900, and the second braking profile may include one second for every fifteen mph the vehicle 900 is traveling based on a current state, $x_A$, of the vehicle 900. Continuing with the preceding example of the vehicle 900 traveling at sixty mph, the first braking profile may include coming to a stop within three seconds, and the second braking profile may include coming to a stop within four seconds.

As another example, the claimed set may represent the safety procedure with a first steering profile (e.g., a defined maximum steering profile) for reaching a lateral location (e.g., the side of the road, lining up with the road, etc.) more quickly than a second steering profile, and may represent the safety procedure with the second steering profile for reaching the lateral location more slowly than the first steering profile. In such an example, thresholds or bounds may be set and/or determined to define the first steering profile (e.g., a defined maximum or upper bounded steering profile) and the second braking profile (e.g., a defined minimum or lower bounded steering profile). In such an example, the claimed set may represent each of the points in space-time occupied by the actor by the safety procedure applied with the first steering profile, the second steering profile, and the points in space-time occupied by the actor that fall between the first and second steering profiles. Depending on the embodiment, the thresholds or bounds for generating the claimed set may be different.

Similar to the thresholds or bounds for the braking profiles, the steering profiles may also be based on percentages (e.g., percentages of steering angle intensity) and/or time (e.g., amount of time to reach the lateral position).

Figure 3A:
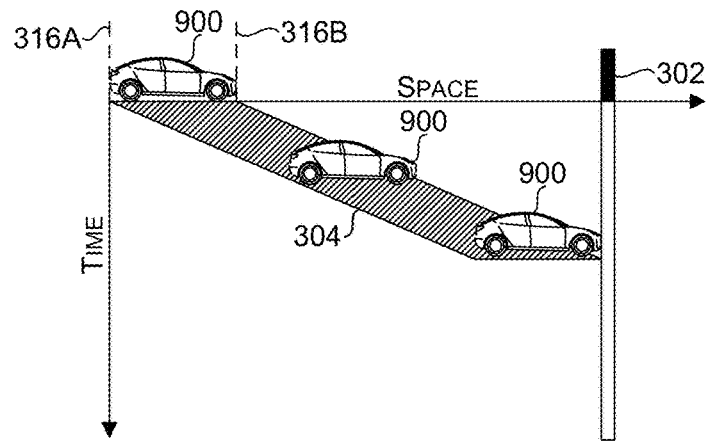
FIGS. 3A-3C depict examples of space-time plots of a vehicle executing safety procedures, in accordance with some embodiments of the present disclosure.

As a simplified example of claimed sets, and with reference to FIG. 3A, the vehicle 900 may be driving toward a static object 302 (where the driving direction is represented in one dimension in the space-time plot of FIG. 3A). The vehicle 900, when not executing a safety procedure, may have an occupied trajectory 304 that results in the vehicle 900 colliding with the static object 302 (e.g., the vehicle 900 does not implement a safety procedure, but rather continues driving along the same path at the same speed until colliding with the object). The static object 302 is fixed along the space dimension in the space-time plot because the static object 302 does not move. In this example, a bounding polygon may be used to represent the size of the vehicle 900 (e.g., a bounding polygon extending from the front to the back of the vehicle 900, between bounding lines 316A and 316B).

Figure 3B:
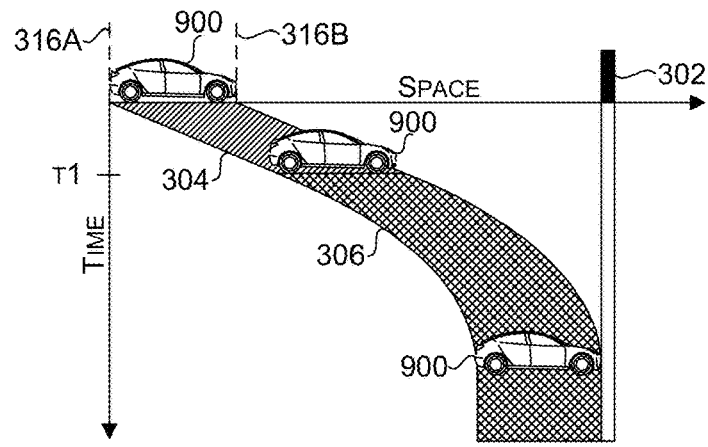

To account for the situation of FIG. 3A, a safety procedure may be implemented, such as to brake until the vehicle 900 comes to a complete stop prior to colliding with the static object 302. For example, and with respect to FIG. 3B, a trajectory generator may generate the trajectory 306, represented by a corresponding claimed set as determined by the claimed set determiner 112, corresponding to the safety procedure, and the vehicle 900 may implement the safety procedure at time, T1, such that the vehicle 900 stops just prior to colliding with the static object 302. The trajectory 306 (e.g., representing the claimed set of the trajectory of the safety procedure) may be persistently projected into space until the trajectory 306 is determined to almost intersect the static object 302 (e.g., at time, T1), and then the vehicle 900 may implement the safety procedure by actuating the brakes at an intensity that corresponds to the safety procedure (e.g., an intensity that will stop the vehicle 900 prior to colliding with the static object 302, with some margin for error, depending on the embodiment). In some examples, the trajectory 306 may correspond to a second braking profile (e.g., defined minimum or lower bounded braking profile).

Figure 3C:
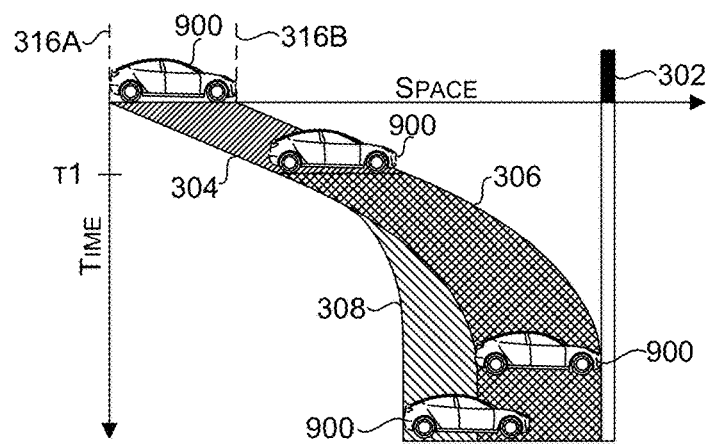

As another example, and with respect to FIG. 3C, the generated trajectories 306 and 308, represented by the corresponding claimed set as determined by the claimed set determiner 112, that correspond to a safety procedure implemented using two different braking profiles (e.g., the claimed set may include each of the points in space-time occupied by the vehicle 900 if the vehicle 900 were to implement both the first trajectory 306, the second trajectory 308, and/or any trajectory in-between). For example, the trajectory 306 may include a first braking profile (e.g., a defined minimum or lower bounded braking profile) and the trajectory 308 may include a second braking profile (e.g., a defined maximum or upper bounded braking profile). In this example, the vehicle 900 may implement the safety procedure just prior to the trajectory 306 colliding with the static object 302 (e.g., at time, T1). Thus, the trajectory 306 and/or 308 (as represented by the corresponding claimed set) may be projected into space-time until the trajectory 306 (or 308, in some examples) is determined to almost intersect the static object 302, and then the vehicle 900 may implement the safety procedure by actuating the brakes at an intensity that corresponds to the chosen braking profile for the safety procedure.

A property of the claimed set may be that the claimed set does not grow over time when applying the safety procedure. As such, for a safety procedure, the minimum (or safety) braking profile and the maximum braking profile may be defined such that the claimed set is not increasing (although the claimed set may decrease). As such, at each time step or stage of implementing the safety procedure, the claimed set may not increase. As a result, when the safety procedure is first implemented, and at the conclusions of the safety procedure (e.g., when at a complete stop), the claimed set should be unchanged.

Figure 3D:
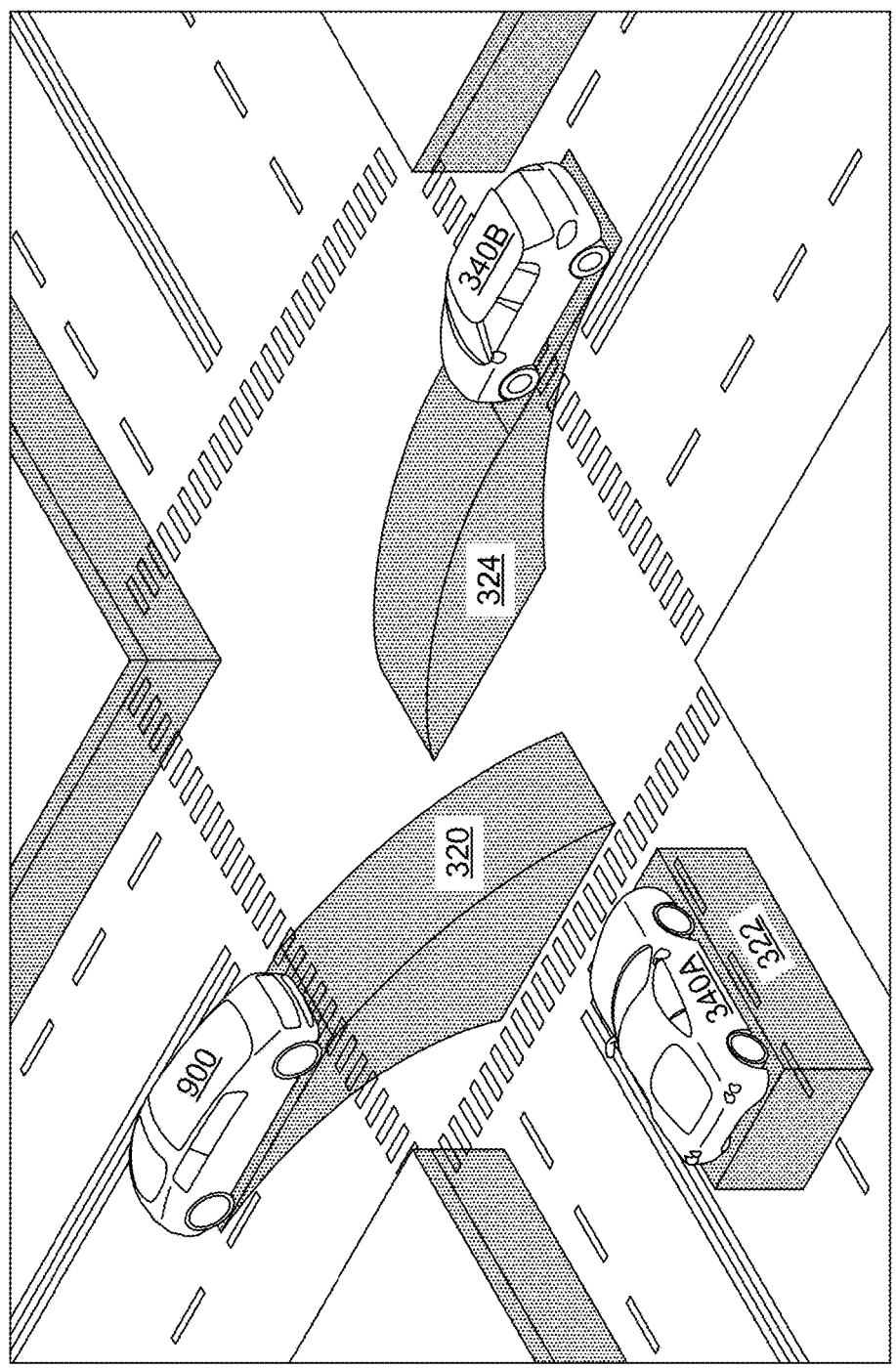
FIG. 3D depicts an example of three-dimensional projections of safety procedures for a plurality of vehicles in space-time, in accordance with some embodiments of the present disclosure.

As another example, and with respect to FIG. 3D, the vehicle 900, a first object 340A (e.g., a vehicle, in this example), and a second object 340B (e.g., a vehicle, in this example) in an environment 326. In this example, the trajectories may occupy a three-dimensional space (e.g., a volume) in space-time within the environment 326. As such, the trajectories may include a longitudinal distance (e.g., a braking or stopping distance), a lateral change (e.g., a steering change), and/or a vertical space (e.g., from the ground plane to a top of a bounding polygon or other shape representative of the occupied set of the actor) occupied by the actors (e.g., the vehicle 900, the first object 340A, and the second object 340B) if the actors were to implement their respective safety procedures. As such, the trajectories may be analyzed as solid volumes with lengths that increase with velocity (e.g., the faster the actor is moving, the longer the trajectory(ies) and the corresponding points in space-time included in the occupied sets), and the actors may be characterized as driving around with these volumes attached to them (e.g., protruding from them) while performing collision analysis for the volumes (e.g., the trajectories) instead of performing collision analysis on their actual shape. As a result, by guaranteeing no collision in space-time volumes, a guarantee of no collisions in actual space may be induced. This may provide a benefit because avoiding collisions between actual physical objects in actual space requires foresight since actors have inertia, and once a physical overlap takes place, it may already be too late. However, in space-time, the volumes or trajectories may be thought of as frozen once an intersection, overlap, or near intersection or overlap is determined between the volumes in space-time and, because there are both lateral and longitudinal dimensions, and shared geometry between the vehicle 900 and the object(s) may not be allowed, the vehicle 900 may be free from collisions (or at least may not contribute to a likelihood of a collision, because other actors actions are outside of the control of the vehicle 900).

In such an example, the vehicle 900 may generate the vehicle-occupied trajectory(ies) 320 representative of the safety procedure for the vehicle 900 (applied over a range of profiles, in some examples), the object-occupied trajectory(ies) 322 representative of the safety procedure for the first object 340A, and the object-occupied trajectory(ies) 324 representative of the safety procedure for the second object 340B. In the illustration of FIG. 3D, there is no overlap or intersection, or near overlap or intersection, between any of the trajectories 320, 322, and 324. As such, at the point in time illustrated in FIG. 3D, neither the vehicle 900, the first object 340A, nor the second object 340B may implement their safety procedures. However, were one of the trajectories 320, 322, or 324 to overlap or nearly overlap with another of the trajectories 320, 322, or 324, the actors involved in the overlap or near overlap would be expected to implement their safety procedures (e.g., the vehicle 900 would implement the safety procedure if involved, and would expect the other actor to implement their respective safety procedure, in order to avoid a collision).

The points in space-time occupied by the projection of the trajectory(ies) 320 may include the claimed set of the vehicle 900 when implementing the safety procedure. Similar to described herein with respect to FIG. 2C, the vehicle-occupied trajectory(ies) 320 may include a first braking profile, a second braking profile, a braking profile of another threshold, and/or a combination thereof. Similarly, the points in space-time occupied by the projection of the object-occupied trajectory(ies) 322 may include the claimed set of the first object 340A, and the points in space-time occupied by the projection of the object-occupied trajectory 324 may include the claimed set of the second object 340B.

In some examples, latency, discretization, and/or reaction time may be at least a few of the practical limitations that may be modeled. For example, the vehicle 900 may deal with a limitation in perception, or more precisely perception and action, in the sense that when an actor takes action, it is inevitably based on perception that is not completely current (e.g., with a time delay). As a result, when the actor takes action, it may be based on perception of the world at some earlier point in time. For example, an actor (e.g., a human actor, such a manually driven vehicle, or a pedestrian), may have some reaction time (e.g., based on lack of attentiveness due to looking at a phone, or reaching for something, etc.) before noticing that a potential collision may occur. In such an example, the vehicle 900 may account for this reaction time. In other examples, an actor, such as a vehicle, may include a latency or lag between when a command is received and when the actuation actually occurs. The latency or lag may be known (e.g., after identifying a vehicle type, for example), or may be perceived (e.g., using one or more neural networks). In such examples, the vehicle 900 may account for this latency or lag. In any example, the shape (e.g., length, width, height, etc.) of the trajectory(ies) of the claimed sets for the actors (e.g., the vehicle 900 and/or the objects) may be adjusted (e.g., lengthened, widened, etc.) to account for latency, lag, or reaction time.

In some examples, it may be assumed that the amount of latency is $\Delta t$. In order to account for $\Delta t$, in some examples, a form of worst-case forward prediction may be used, such that a forwarded set, $\Phi_A(x_A,\Delta t)$, of actor A by a time interval, $\Delta t$, is the set of all states that actor A could possibly get to at the time interval $\Delta t$ after being in state, $x_A$. The forwarded set of a collection, $\Theta$, of actors by a time interval, $\Delta t$, may be the union of the forwarded sets of all actors in $\Theta$, as represented by equation (14), below:

$$\Phi(\Theta,\Delta t)=\cup_{A\in\Theta}(x_A,\Delta t) \qquad (14)$$

An actor may typically have a better ability to predict its own state than that of other actors. In particular, in the control system of the vehicle 900, the actual command sequence that was previously sent may be known, providing an ability to predict where the actor itself will be when the actuation command (e.g., delivered to actuation component(s) of the vehicle 900) that is deliberated now is actually issued. For practical purposes, this may allow the forwarded set to include only one point, effectively resulting in deterministic forwarding, and further resulting in a single actor state. In general, the forwarding mechanism may be non-deterministic forwarding, and may result in a set of states. While in some examples non-deterministic forwarding of the actor itself may be used, and may require that the control policy is safe for all the possible states the actor, in other examples, in order to reduce complexity, deterministic forwarding of the actor itself may be assumed.

A result may be a control policy for the forwarded actor, assuming implicitly that the state parameterization is updated with prediction based on all the actuation commands in the queue up to the actuation command currently deliberated. With these assumptions, the control command may apply to the actor state considered, and the only delay may be the information regarding other actors (e.g., the objects other than the vehicle 900).

A forwarded control policy may be safe at the current time with respect to wherever the perceived collection of actors moved, despite the latency limitations between perception and action. This again may be a direct consequence of the worst-case assumption and the definition of a safe control policy. Since all constraints (e.g., from wherever in the environment other actors may reach at the time the control of the vehicle 900 is executed) that may be present are assumed to be present, the vehicle 900 may thus be obeying all relevant constraints.

In addition, the vehicle 900 of the present invention may combine latency awareness with visibility awareness, and may use this information to avoid entering unreasonable states. For example, consider the set, $\Phi(V, \Delta t) \cup (\Phi(\Lambda, \Delta t) \cap \Psi)$ where $V$, $\Lambda$, $\Psi$ are the sets of visible, invisible, reasonable actors respectively. First, visibility may be taken into account to provide a complete collection representing all the actors (visible and invisible, as described herein) in the world that may be desirable to consider at one point in time. Then, latency may be taken into account on this complete world representation by forwarding the set of actors. Finally, unreasonable actors may be excluded from the forwarded set of invisible actors. In some examples, unreasonable actors may be excluded prior to the forwarding; however, this would not allow accounting for unreasonable actors who make it into reasonable states during forwarding. In addition, although unreasonable invisible actors may be excluded, unreasonable visible actors may not be excluded in some examples, because removing actually perceived actors may not result in an accurate world state.

Once each of the actors (visible, invisible, occluded, etc.) to be analyzed are determined, intersection checks may be executed using an intersection checker 116. For example, each of the actors in the environment may be determined, and one or more of the actors may be filtered out using the actor pair filter 108, as described herein. After filtering is performed, and a final set of actors for intersection checking are determined, the intersection checker 116 may perform intersection checks. However, because performing intersection checks on overlaps between individual points (e.g., each point within a claimed set of the vehicle 900 in view of each point within a claimed set of an actor) for each actor may be compute intensive, especially in 3D (e.g., 2D space and 1D time), the occupied trajectories may be generated, converted, or transformed to 2D space (e.g., by collapsing or removing the temporal or third dimension) and/or may be represented by a boundary (e.g., polylines) corresponding a projection of the occupied trajectory. By reducing the intersection check to 2D space and/or performing intersection checks against edges of boundaries of 2D projected occupied trajectories (alternatively referred to herein as "projected trajectories"), the compute resources required are reduced such that the process 100 may be executed in real-time or near real-time for evaluating potential or proposed paths from the path generator 114.

In addition, although compute and run time are decreased, the accuracy of the intersections checks using the 2D projected trajectories may still satisfy a desired accuracy level for safety-critical application—similar to that of 3D occupied trajectories. The mathematical observation the intersection check relies on is that if two volumes intersect in higher-dimensional space (e.g., 3D space), then there cannot be a projection into any lower-dimensional space (e.g., 2D space) in which the projected shapes do not intersect. So, if two projected trajectories are disjoint, then the original occupied trajectories must also be disjoint. As such, a 2D intersection of projected trajectories (e.g., projected claimed sets) is a necessary condition for having a 3D intersection of occupied trajectories (e.g., claimed sets in 3D space-time). As a result, the lower-dimensional space may be leveraged as a necessary condition—in embodiments—for selecting paths that are free of collisions.

Figure 5:
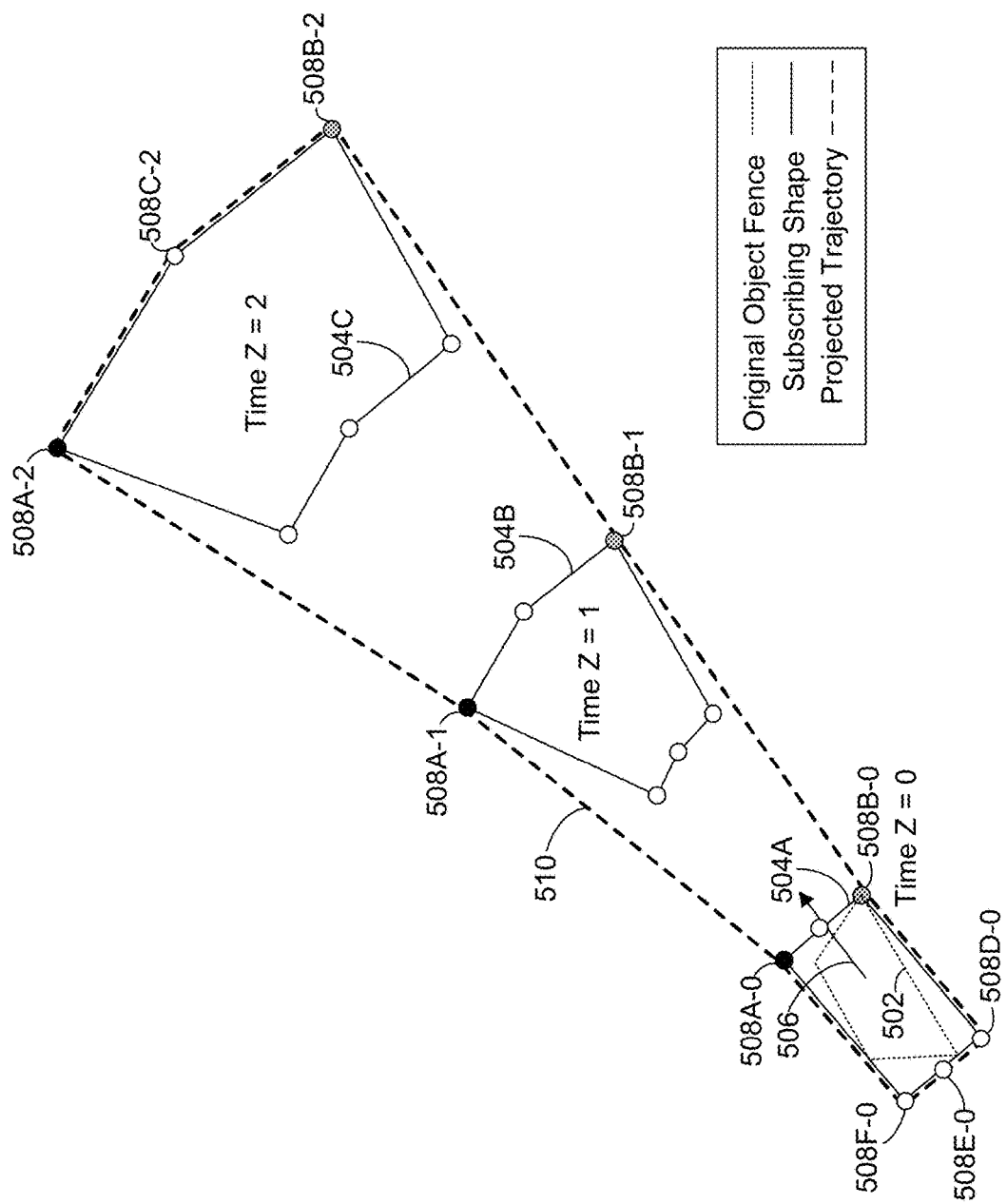
FIG. 5 depicts an example of computing a projected trajectory from a subscribing shape of an actor, in accordance with some embodiments of the present disclosure.

As such, and with respect to FIG. 5, an original object fence 502 corresponding to an object (e.g., the vehicle 900 or another actor) may be determined, and a subscribing shape 504 (e.g., 504A-504C)—such as a subscribing rectangle, polygon, etc.—may be computed from the original object fence 502. The subscribing shape 504 may be approximated using extremal values of the original object fence 502 relative to an actor pose (e.g., position, orientation, etc.). As such, the subscribing shape 504 may be positioned or oriented relative to the actor pose, and the dimensions of the subscribing shape 504 may be computed such that the entirety of the original object fence 502 is contained within the subscribing shape 504. The subscribing shape 504 may be computed to conform directly to the extremal values of the original object fence 502 (e.g., as illustrated in FIG. 5), or may be large enough to include a buffer (e.g., to account for inaccuracy in predictions of the original object fence 502, a safety margin, etc.). At each time instance or step, a front left vertex 508A (illustrated with black fill) and a front right vertex 508B (illustrated with gray fill) of the subscribing shape 504 may be predicted forward according to the claimed set determiner 112, as described herein, and the front left vertices 508A and front right vertices 508B may be connected through time to define edges of a projected claimed set 510 (which may define, in embodiments, a projected trajectory). For example, front left vertices 508A-0, 508A-1, and 508A-2 (although only three time steps are shown, there may be any number, N, of time steps) may be connected, front right vertices 508B-0, 508B-1, and 508B-2 may be connected, and a front middle vertex 508C-2 of a last or final step corresponding to the projected claimed set 510 may be used to define the top most portion (or most forward in time portion) of the projected claimed set 510 (e.g., an edge may be extended from a last instance of the front left vertex 508A-2 to a last instance of the front middle vertex 508C-2 and another edge may be extended from a last instance of the front right vertex 508B-2 to the last instance of the front middle vertex 508C-2). Vertices 508D-0, 508E-0, and/or 508F-0 may be used to define a rear most portion of the projected claim set 510. As a result, the edges may define the projected claimed set 510 (indicated by dashed lines in FIG. 5) and may be compared to projected trajectories of other actors in the environment. Although three time steps (time Z=0, Z=1, and Z=2) are depicted in FIG. 5, this is not intended to be limiting, and depending on the embodiments, the projected claimed set 510 may be projected over any number of time steps.

In some embodiments, the subscribing shapes 504A, 504B, and 504C may not include a same shape at each time instance. For example, due to a variety of factors, such as those described herein, including latency, command delays, safety margins (e.g., expanding the claimed set over time to account for inaccuracies in predictions further into the future), etc., the subscribing shapes 504 may be different shapes at each time step. In addition, where the temporal dimension is computed and then collapsed, the shape of the occupied trajectory may increase over time and, as a result, may result in a larger respective subscribing shape 504 as time progresses. For example, with reference to FIG. 3D, the projected trajectories 510 may correspond to the trajectories 320, 322, and 324 after projecting the trajectories 320, 322, and 324 onto a 2D plane—e.g., a ground plane—determining the subscribing shapes 504 from the projection at each time stamp, and connecting each subscribing shape 504 over time using edges to generate an outline of edges corresponding to the projected trajectory 510 that may be used for intersection checking (and/or for complete containment checking).

In embodiments where there are stationary actors—e.g., parked cars—the shape of the original object fence 502 may be used for the object instead of a subscribing shape 504. This may be the result of claimed sets—and thus projected trajectories 510—of stationary objects only including the current location of the object (e.g., with no speed element, there is no need for coming to implement a safety procedure to come to a stop as the object is already at rest). However, in other embodiments, even stationary objects may have subscribing shapes 504. In addition, in some embodiments, a subscribing shape may not be used for dynamic actors and the original object fence may be used instead.

As such, at each point or time instance corresponding to a proposed path, a projected trajectory may be computed for the vehicle 900 and each other actor under consideration (e.g., actors that have not been filtered out). For example, a projected trajectory may be computed at a first time instance corresponding to a proposed path (e.g., from a location in world space corresponding to the point along the path where the vehicle 900 would be at the first time instance), and a projected trajectory may also be computed for each other actor at a location along a predicted path of the actor at a point corresponding to the first time instance. This may be repeated for each time instance corresponding to the proposed path of the vehicle 900 and the predicted paths of the actors. Then, at each time instance, an intersection check may be performed between edges of the projected trajectory of the vehicle 900 and the projected trajectories of the actors. The intersection check may also include checking for fully contained actors (e.g., where an actor's projected trajectory is fully within the projected trajectory of the vehicle 900, or vice versa). This may be performed by, as a non-limiting example, projecting a semi-infinite ray from a vertex of a projected trajectory of the actor, counting the number of intersections of the ray with the projected trajectory of the vehicle 900, and using the number to determine whether the projected trajectory of the actor is fully contained within the projected trajectory of the vehicle 900. Where full containment is present, the corresponding actor may be determined to have a collision event with the vehicle 900, and the corresponding path of the vehicle 900 may be removed as an option or penalized (e.g., prescribed a negative weight) with respect to collision mitigation considerations.

Figure 6:
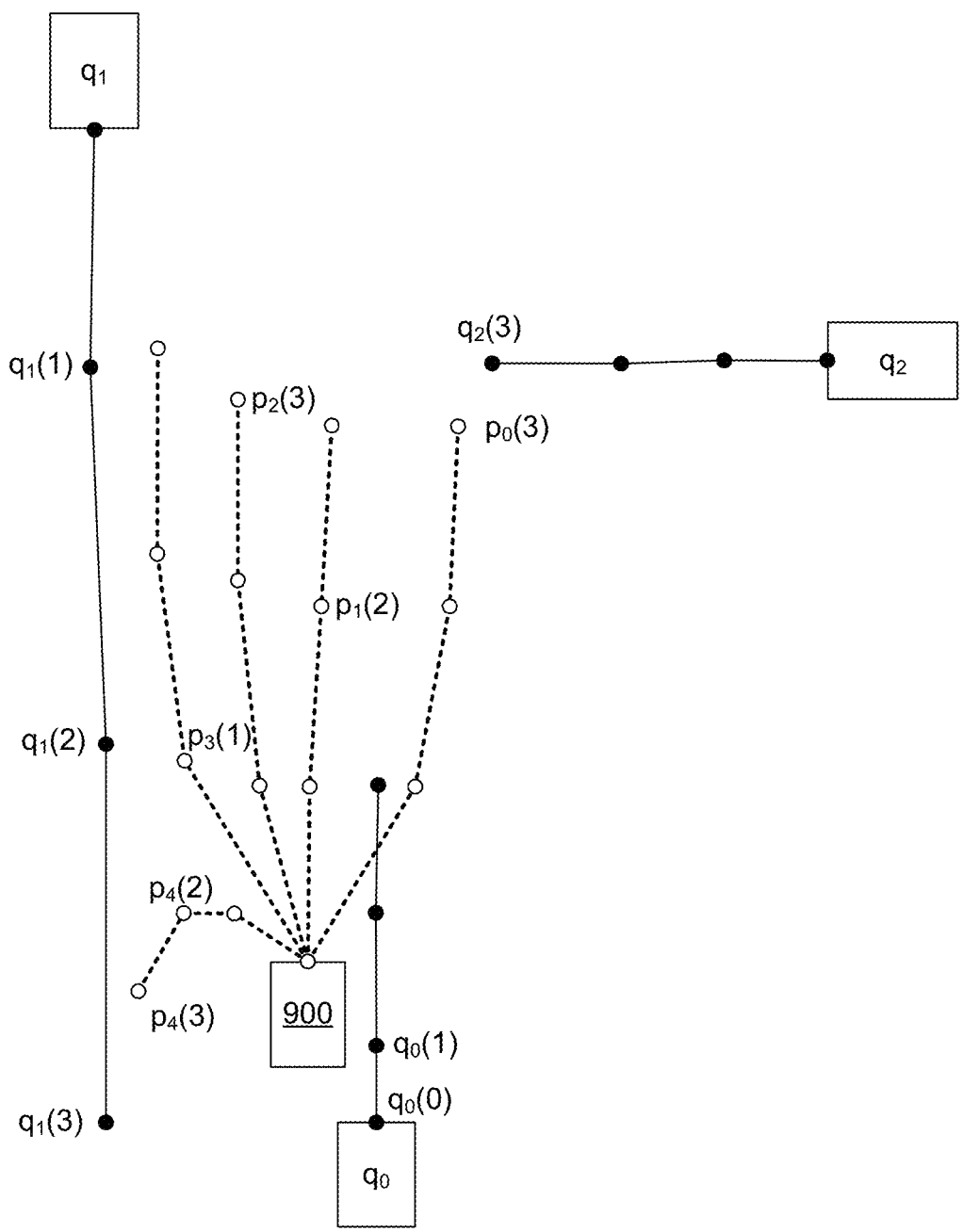
FIG. 6 depicts an example of proposed paths of an ego-vehicle and predicted paths of actors for intersection checking of projected trajectories corresponding thereto, in accordance with some embodiments of the present disclosure.

As an illustrative example, and with respect to FIG. 6, the path generator 114 may generate a plurality of paths for the vehicle 900—e.g., path $p_o$, $p_1$, $p_2$, $p_3$, and $p_4$—and may generate a path(s) for each of the actors $q_o$, $q_1$, and $q_2$. In this non-limiting example, each path may include four time steps or stamps (e.g., 0, 1, 2, and 3). At each time step, and for each actor—including the vehicle 900—a projected trajectory may be generated (although not illustrated in FIG. 6 for clarity purposes). The projected trajectory of the vehicle 900 may be compared against each projected trajectory of each actor at the time step, and this process may be repeated for each time step. As the computations of intersections are executed, the individual time steps for each path and/or the paths as a whole of the vehicle 900 may be given a weight or score, and the final value for each path may be used by the path selector 120 in selecting a final path from the paths $p_0$, $p_1$, $p_2$, $p_3$, and $p_4$. For the purposes of this illustration, we may assume that the length of a projected trajectory is roughly the same as a distance between two points on a path, and the width of a projected trajectory is roughly a width of a car.

When analyzing each of the paths of the actors in view of the paths of the vehicle 900, it may be determined that actor $q_0$ and each of the paths $p_0$, $p_1$, $p_2$, and $p_3$ are free of intersections (or containment) events. This may be due to the lead-follow relationship of the actor $q_o$ and the vehicle 900 and, as a result, the computation of projected trajectories and performing intersection checks may not be required for paths $p_o$, $p_1$, $p_2$, and $p_3$ in view of the path of the actor $q_o$—e.g., the actor pair filter 108 may have filtered out the path of the actor $q_o$ with respect to paths $p_o$, $p_1$, $p_2$, and $p_3$. With respect to $q_o$ and $p_4$, some of the time steps may be eliminated by the actor pair filter 108—e.g., time steps 1 and 2—while the remaining time steps may be determined to have disjoint or non-intersecting projected trajectories. As a result, there may be no collision events with respect to $q_o$ and any of the paths of the vehicle 900.

Further, when analyzing each of the paths of the actors in view of the paths of the vehicle 900, it may be determined that a path of the actor $q_1$ and each of the paths of the vehicle 900 at time steps 0 and 3 are filtered out by the actor pair filter 108 due to longitudinal separation (e.g., the actor $q_1$ may be outside of a radius of consideration of the vehicle 900 and/or may be traveling along an opposite direction). At time step 1, there may be a projected trajectory intersection at $p_3(1)$, and at time step 2, there may be a projected trajectory intersection at $p_4(2)$. As a result, both paths $p_3$ and $p_4$ may have intersection (or containment) determinations and may be filtered out or penalized as a result.

With respect to actor $q_2$, and when analyzing each of the paths of the actors in view of the paths of the vehicle 900, it may be determined that a path of the actor $q_2$ and each of the paths of the vehicle 900 at time steps 0, 1, and 2 are filtered out by the actor pair filter 108 to longitudinal separation. At time step 3, there may be a projected trajectory intersection at $p_o(3)$. As a result, the path $p_o$ may have an intersection determination and may be filtered out or penalized as a result.

As a result, the path selector 120 may determine that the paths $p_1$ and $p_2$ are the best options with respect to safety or collision avoidance considerations, and this information may be used, at least in part, to determine the final path for the vehicle 900. Once the final path is determined, the planning component(s) 118 may pass this information to the control component(s) 122 of the autonomous driving software stack, and the control component(s) 122 may determine controls for the vehicle 900 for actuating the vehicle 900 according to the selected path. This process may be completed at each time instance such that new paths are generated, analyzed, and selected, and the vehicle 900 follows the paths selected by the path selector 120 along the way.

In some examples, in order to compute the intersections between the projected trajectory of the ego-vehicle 900 and the projected trajectories of the actors, the trajectories may be transformed or projected in relation to one another. For example, the system may determine, for each time slice (e.g., for each segment of time used by the system, or each discrete time step), a change in location and orientation of the ego-vehicle with respect to a first time slice (e.g., the current time). The system may then apply a transformation (e.g., an affine transformation), as a function of the change in location and orientation, to the projected trajectory of the ego-vehicle for each time slice after the first time slice in order to effectively cancel out (at least along the axis(es) of movement) the change in the projected trajectory of the ego-vehicle 900 over time. The system may also apply the same transformation, based on the change in location and orientation of the ego-vehicle 900, to the projected trajectories of the actors for each time slice after the first time slice in order to render the projected trajectories of the actors in relation to the now (substantially) static projected trajectory of the ego-vehicle 900.

As a result, the ego-vehicle 900 may appear stationary while the actors may appear to move with respect to the ego-vehicle 900. Using these processes, intersections between the projected trajectories may be more clearly computed (or visualized). In some embodiments, using this transformation (e.g., a homeomorphism followed by a projection) to generate the relative projected trajectories may be used in addition to or alternatively from the 1D lookup 110 by the actor pair filter 108. For example, because the projections would be relative to the ego-vehicle 900, a constant gap or space between the transformed projected trajectory of an actor and the transformed projected (now static) trajectory of the ego-vehicle 900 may be easily observable and leveraged for spatial relationship evaluations. As a result, this transformation would make the projected 2D intersection check a necessary and sufficient condition for the 3D intersection check.

Figure 7:
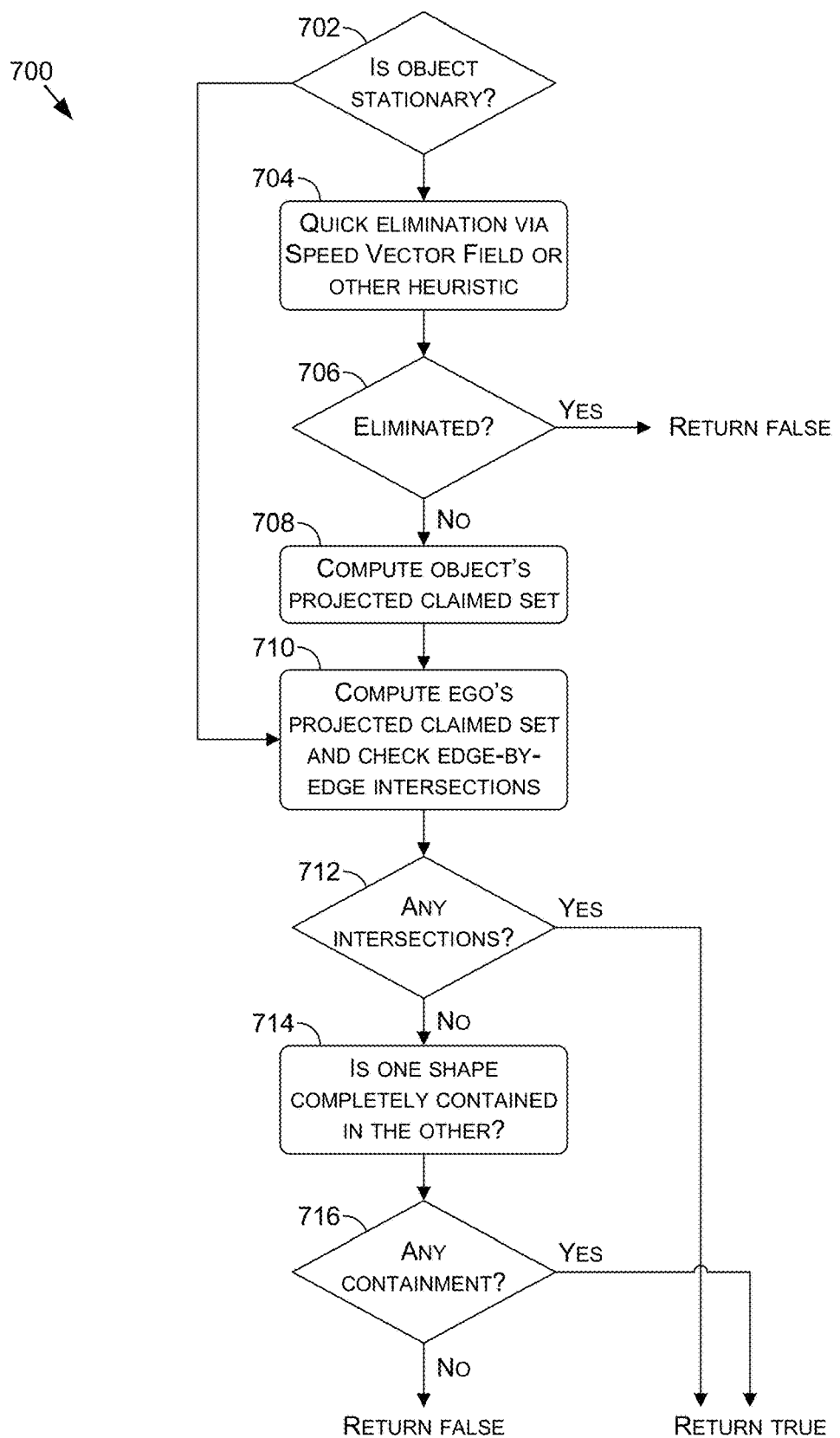
FIG. 7 is a flow diagram showing a method for intersection checking, in accordance with some embodiments of the present disclosure.
Figure 8:
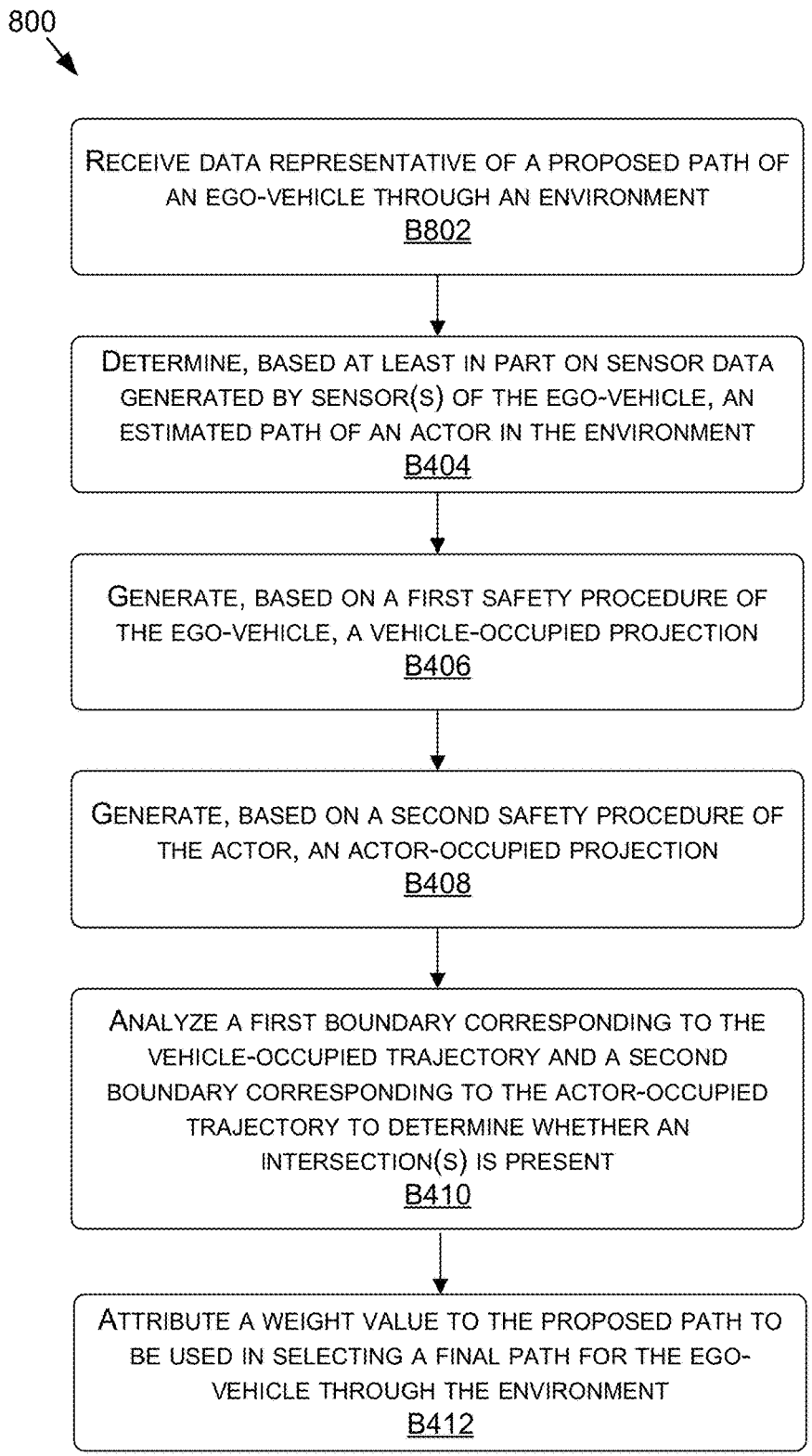
FIG. 8 is a flow diagram showing a method for path selection based on collision avoidance considerations, in accordance with some embodiments of the present disclosure.

Now referring to FIGS. 7 and 8, each block of methods 700 and 800, described herein, comprises a computing process that may be performed using any combination of hardware, firmware, and/or software. For instance, various functions may be carried out by a processor executing instructions stored in memory. The methods 700 and 800 may also be embodied as computer-usable instructions stored on computer storage media. The methods 700 and 800 may be provided by a standalone application, a service or hosted service (standalone or in combination with another hosted service), or a plug-in to another product, to name a few. In addition, methods 700 and 800 are described, by way of example, with respect to the process 100 of FIG. 1 and the vehicle 900 of FIGS. 9A-9D. However, these methods 700 and 800 may additionally or alternatively be executed by any one system and/or process, or any combination of systems and/or processes, including, but not limited to, those described herein.

With reference to FIG. 7, FIG. 7 is a flow diagram showing a method for intersection checking, in accordance with some embodiments of the present disclosure. The method 700, at block B702, includes determining whether an object—or a pose thereof at some future time step—is stationary and/or has such a low speed (e.g., below a threshold speed, such as 1 mph) that the object may be considered stationary. If the object is stationary, the process 700 continues to block B710. If the object is not stationary, at block B704, a quick elimination via a speed vector field or other heuristic (e.g., via the actor pair filter 108) may be executed. If the actor is eliminated at block B706 by the actor pair filter 108, the process 700 may return false. If the actor is not eliminated at block B706, at block B708 a projected claimed set (e.g., projected trajectory) of the actor may be computed. At block B710, a projected claimed set (e.g., projected trajectory) of the ego-vehicle 900 may be computed and an edge-by-edge intersection check with a projected trajectory of the actor may be executed. At block B712, if intersections are determined, the process 700 may return true. If no intersections are determined, at block B714 a containment determination may be executed to determine if one of the shapes (e.g., the projected trajectory of the ego-vehicle 900 or the projected trajectory of the actor) is completely contained within the other's shape. At block B716, if there is complete containment, the process 700 returns true; otherwise, the process 700 returns false. As such, a return of true may indicate that an intersection or complete containment is present and that the path—or at least the point along the path for a particular time step(s)—should be removed and/or penalized.

Now referring to FIG. 8, FIG. 8 is a flow diagram showing a method 800 for path selection based on collision avoidance considerations, in accordance with some embodiments of the present disclosure. The method 800, at block B802, includes receiving data representative of a proposed path of an ego-vehicle through an environment. For example, the path generator 114 may generate one or more paths for the vehicle 900.

The method 800, at block B804, includes determining, based at least in part on sensor data generated by sensor(s) of the ego-vehicle, an estimated path of an actor in the environment. For example, an estimated path of one or more actors in the environment may be generated by the path generator 114 based on the sensor data 102.

The method 800, at block B806, includes generating, based on a first safety procedure of the ego-vehicle, a vehicle-occupied projection. For example, once the safety procedure determiner 106 determines a safety procedure for the ego-vehicle, a claimed set of the ego-vehicle 900 may be determined. The claimed set may represent an occupied trajectory of the ego-vehicle in 2D space or 3D space, and the occupied trajectory may be used to determine a projected trajectory for the ego-vehicle 900—e.g., by collapsing or projecting the temporal dimension of the occupied trajectory. In addition, the modeling of the projected trajectory may include taking each of the points corresponding to the claimed set of the ego-vehicle 900 and generating a subscribing shape around them at each time stamp. This subscribing shape may be projected forward over a period of time, and the projection of the subscribing shape over time may be used to generate edges that define the projected trajectory.

The method 800, at block B808, includes generating, based on a second safety procedure of the actor, an actor-occupied projection. For example, once the safety procedure determiner 106 determines a safety procedure for the actor, a claimed set of the actor may be determined. The claimed set may represent an occupied trajectory of the actor in 2D space or 3D space, and the occupied trajectory may be used to determine a projected trajectory for the actor. In addition, the modeling of the projected trajectory may include taking each of the points corresponding to the claimed set of the actor and generating a subscribing shape around them at each time stamp. This subscribing shape may be projected forward over a period of time, and the projection of the subscribing shape over time may be used to generate edges that define the projected trajectory.

The method 800, at block B810, includes analyzing a first boundary corresponding to the vehicle-occupied trajectory and a second boundary corresponding to the actor-occupied trajectory to determine when an intersection is present. For example, the intersection checker 116 may compare the boundary of the projected trajectory of the ego-vehicle 900 with that of the actor to determine if any edge-by-edge intersections (or complete containment) are present.

The method 800, at block B812, includes attributing a weight value to the proposed path to be used in selecting a final path for the ego-vehicle through the environment. For example, a weight value may be attributed to the proposed path of the ego-vehicle 900 based on whether any intersections (or complete containment) were determined. This weight value may be used to either filter out the path completely, penalize the path, or reward the path such that the path selector 120 may leverage this information to determine a final path for the ego-vehicle 900.

In some embodiments, in addition to or alternatively from using the systems and methods described herein for computing projected trajectories with respect to safety procedures, the systems and methods may be leveraged for actual collision determination of paths of the vehicle 900 in view of actors. For example, the forward simulation to determine the claimed sets may not be based on a safety procedure, but rather based on some interpolation of a speed or and/or acceleration between time steps. The speed or acceleration may be assumed to be constant, in embodiments, while in other embodiments the speed and/or acceleration at future time steps may be predicted or computed based on various factors—e.g., trajectory predictions from learned models. As a result, the actual trajectories of the actors—including the vehicle 900—may be modeled over time as the projected trajectories, and edge-by-edge intersections may be computed to determine which paths to select—e.g., by weighting the paths based on actual collision determinations.

Example Autonomous Vehicle

Figure 9A:
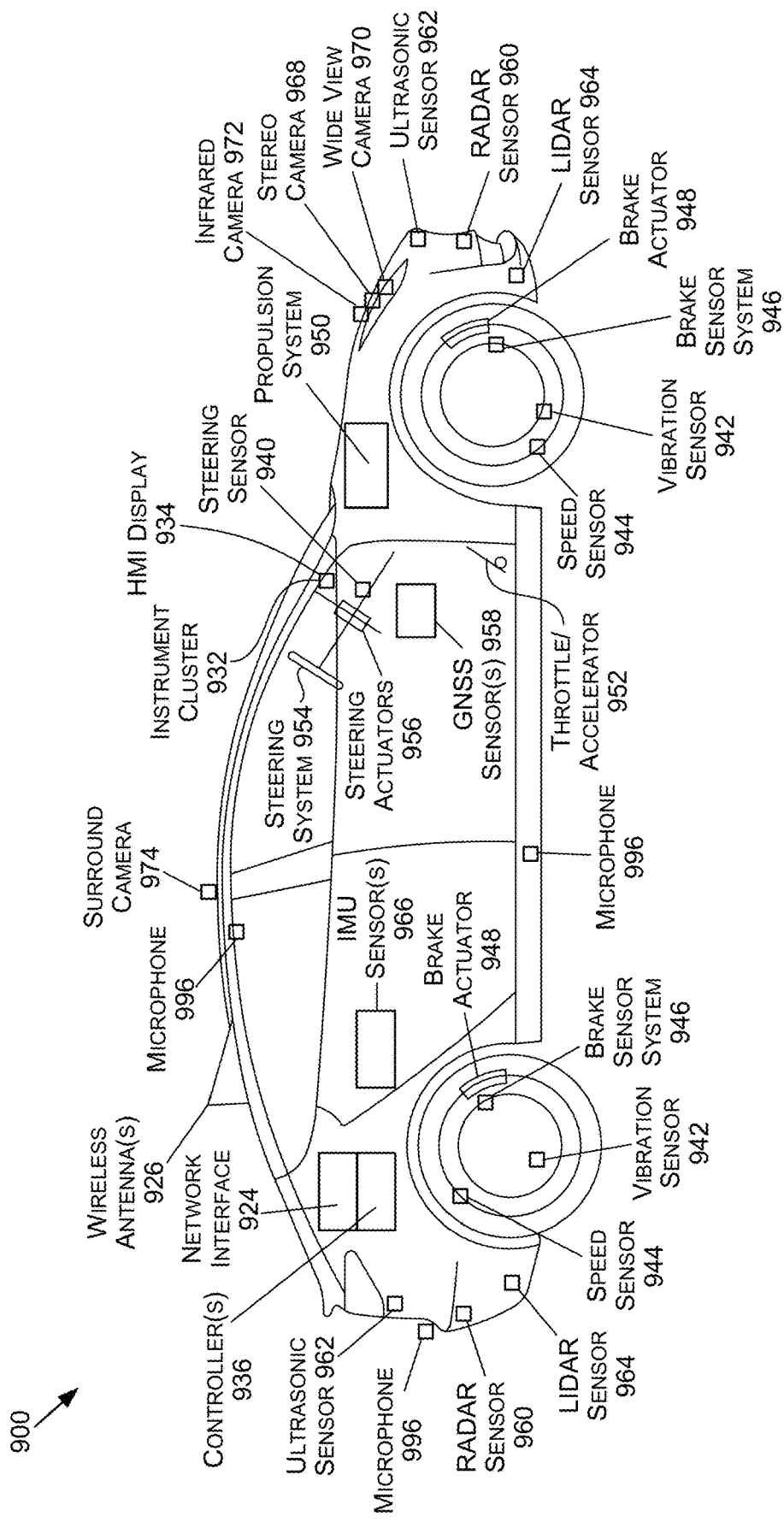
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900", or "ego-vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3—Level 5 of the autonomous driving levels. For example, the vehicle 900 may be capable of conditional automation (Level 3), high automation (Level 4), and/or full automation (Level 5), depending on the embodiment.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the HD map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over LTE, WCDMA, UMTS, GSM, CDMA2000, etc. The wireless antenna(s) 926 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 9B:
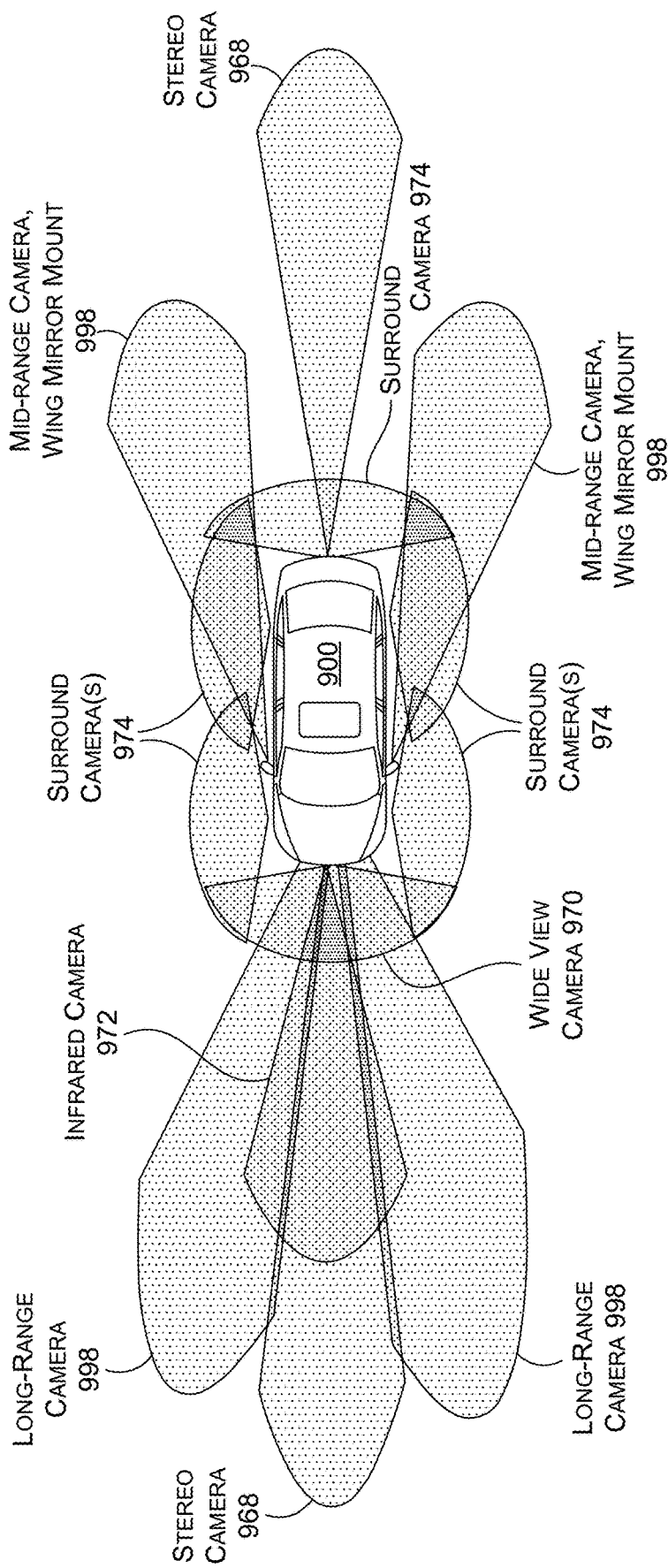
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 920 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may any number of wide-view cameras 970 on the vehicle 900. In addition, long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

One or more stereo cameras 968 may also be included in a front-facing configuration. The stereo camera(s) 968 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
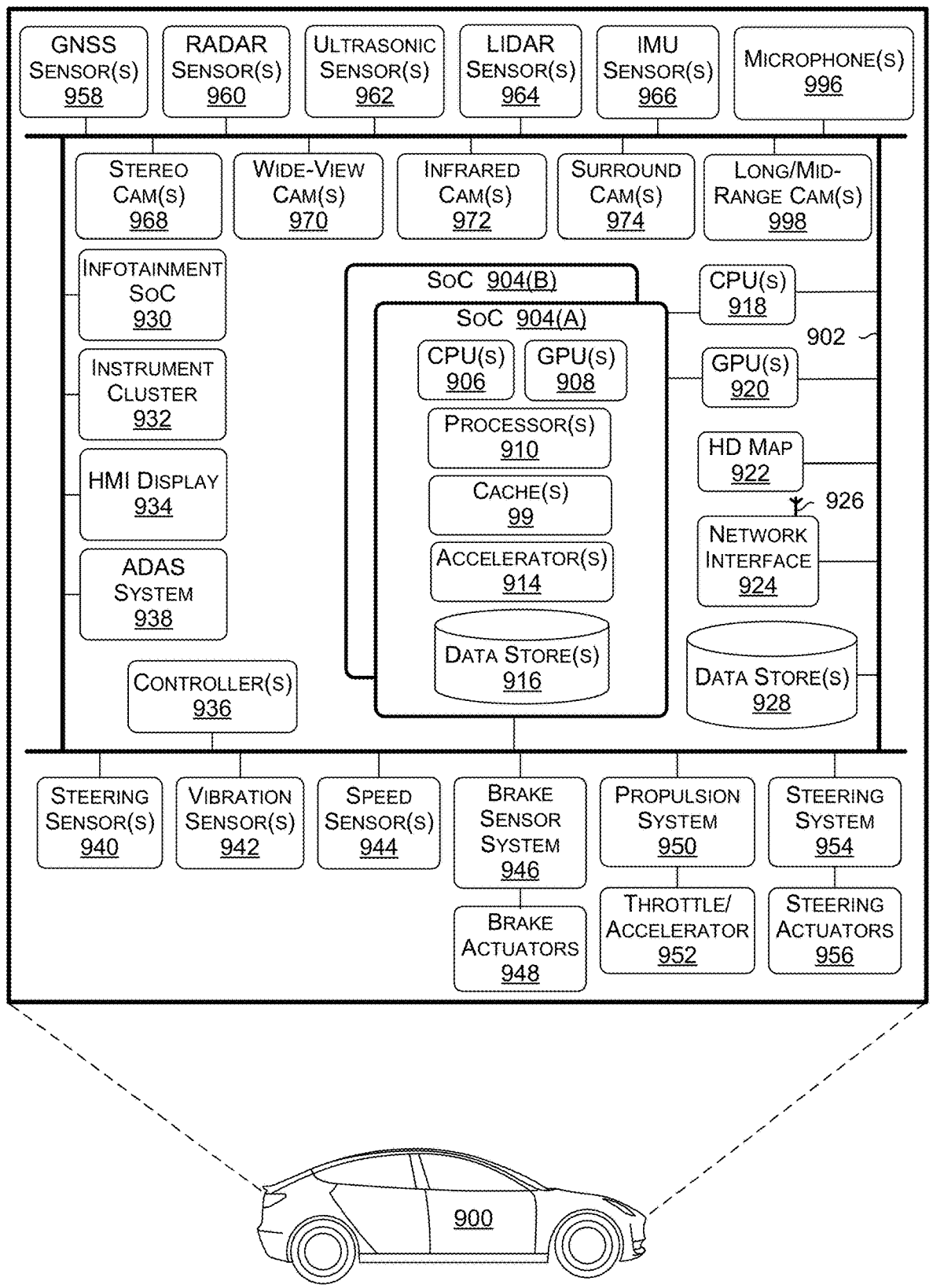
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol.

In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 920-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
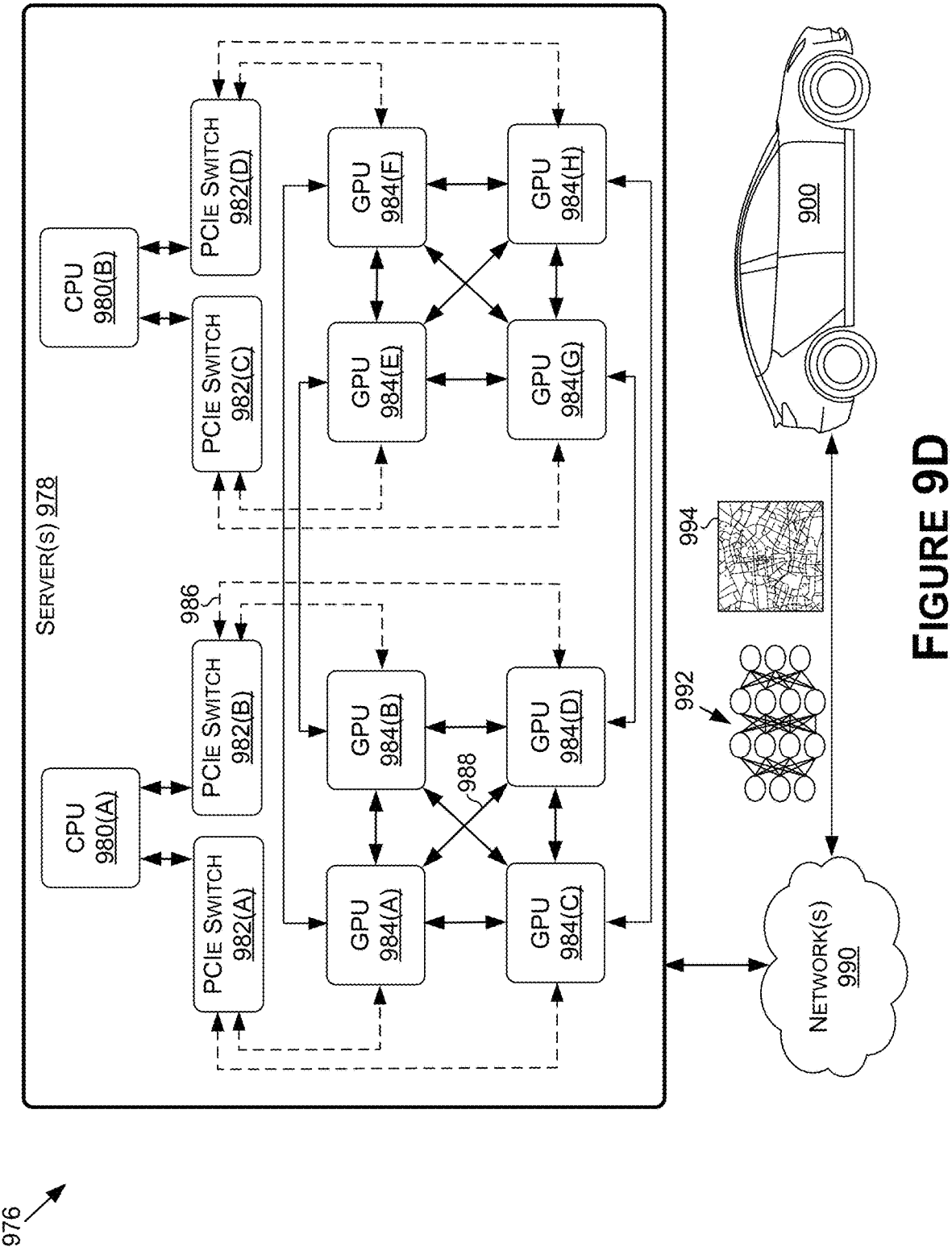
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    generating, based at least on a first safety procedure that is associated with one or more first operations for controlling an ego-vehicle to avoid a collision, a first vehicle-occupied projection corresponding to a first boundary associated with the ego-vehicle in an environment if the ego-vehicle were to implement the first safety procedure at a first time instance along a proposed path and a second vehicle-occupied projection corresponding to a second boundary associated with the ego-vehicle in the environment if the ego-vehicle were to implement the first safety procedure at a second time instance along the proposed path;
    generating, based at least on a second safety procedure that is associated with one or more second operations for controlling an actor to avoid a collision, a first actor-occupied projection corresponding to a third boundary associated with the actor in the environment if the actor were to implement a second safety procedure at the first time instance along an estimated path and a second actor-occupied projection corresponding to a fourth boundary associated with the actor in the environment if the actor were to implement the second safety procedure at the second time instance along the estimated path;
    determining whether the first boundary intersects with the third boundary;
    determining whether the second boundary intersects with the fourth boundary;
    determining, based at least on whether the first boundary intersects with the third boundary and whether the second boundary intersects with the fourth boundary, a weight associated with the proposed path;
    selecting, based at least on the weight, the proposed path for the ego-vehicle through the environment; and
    causing, based at least on the proposed path, performance of one or more third operations associated with control of the ego-vehicle.

2. The method of claim 1, further comprising:
    determining at least one other estimated path of another actor in the environment;
    comparing at least a first point along the proposed path to at least a second point along the at least one other estimated path;
    determining, based at least in part on the comparing, that the first point and the second point satisfy a spatial relationship such that the first point for the first time instance is a threshold distance away from the second point for the first time instance; and
    determining that, over a period of time represented by the second point, there are no intersections between the ego-vehicle and the another actor.

3. The method of claim 2, wherein the determining that the first point and the second point satisfy the spatial relationship comprises:
    determining a distance between the ego-vehicle at the first point and the another actor at the second point;
    determining a speed of the another actor;
    executing, based at least on the distance and the speed, a lookup in a lookup table to determine an interval of speeds for the ego-vehicle;
    comparing an actual speed of the ego-vehicle to the interval of speeds; and
    determining, based at least in part on the comparing the actual speed to the interval of speeds, that the actual speed is within the interval of speeds.

4. The method of claim 1, wherein the generating the first vehicle-occupied projection comprises:
    computing a subscribing shape for the ego-vehicle at the first time instance;
    determining an updated subscribing shape for the ego-vehicle based at least on the first safety procedure and state information of the ego-vehicle; and
    connecting one or more vertices of the subscribing shape and the updated subscribing shape.

5. The method of claim 4, wherein the computing the subscribing shape comprises:
    determining an object fence corresponding to the ego-vehicle; and
    computing the subscribing shape based at least on one or more extremal values of the object fence and an orientation of the ego-vehicle.

6. The method of claim 1, wherein the generating the first vehicle-occupied projection comprises:
    generating, in three-dimensional space corresponding to space and time, the first vehicle-occupied projection representative of one or more points of the ego-vehicle; and
    projecting the first vehicle-occupied projection into two-dimensional space.

7. The method of claim 1, further comprising determining whether the first actor-occupied projection is fully contained within a first vehicle-occupied trajectory by at least casting a semi-infinite ray from a vertex of the actor-occupied projection and counting a number of intersections of the semi-infinite ray with the first boundary.

8. The method of claim 1, further comprising:
generating a shape of a predefined radius and centered at a location on the ego-vehicle;
determining at least one additional path corresponding to at least one additional actor in the environment is entirely outside of the predefined radius; and
determining that, over a period of time represented by the at least one additional path, there are no intersections between the ego-vehicle and the additional actor.

9. The method of claim 1, further comprising generating data representative of the proposed path of the ego-vehicle based at least on sensor data and using one or more components of a planning layer of an autonomous driving software stack of the ego-vehicle.

10. The method of claim 1, wherein:
the one or more first operations are associated with controlling the ego-vehicle to at least one of:
begin slowing using a first deceleration along the proposed path and to a stop; or
navigate to a first new path to avoid the collision; and
the one or more second operations are associated with controlling the actor to at least one of:
begin slowing using a second deceleration along the estimated path and to a stop; or
navigate along a second new path to avoid the collision.

11. A system comprising:
one or more processing units to:
generate, based at least on a first safety procedure associated with an ego-vehicle, a first vehicle-occupied projection delineated by a first boundary associated with the ego-vehicle if the ego-vehicle were to implement the first safety procedure at a first time instance along a proposed path and a second vehicle-occupied projection delineated by a second boundary associated with the ego-vehicle if the ego-vehicle were to implement the first safety procedure at a second time instance along the proposed path;
generate, based at least on the first boundary and the second boundary, a third boundary associated with the ego-vehicle;
generate, based at least on a second safety procedure associated with an actor, an actor-occupied projection delineated by a fourth boundary associated with the actor if the actor were to implement the second safety procedure at the first time instance or the second time instance along an estimated path;
select, based at least on the third boundary and the fourth boundary, the proposed path for the ego-vehicle through the environment; and
control the ego-vehicle to navigate based at least on the proposed path.

12. The system of claim 11, wherein the one or more processing units are further to determine one or more vehicle controls for controlling the ego-vehicle according to the proposed path.

13. The system of claim 11, wherein the one or more processing units are further to:
determine at least one other estimated path of another actor in the environment;
compare at least a first point along at least one of the proposed path to at least a second point along the at least one other estimated path;
determine, based at least on the comparison, that the first point and the second point satisfy a spatial relationship such that the first point for the first time instance is a threshold distance away from the second point for the first time instance; and
determine that, over a period of time, there are no intersections between the ego-vehicle and the another actor.

14. The system of claim 13, wherein the determination that the first point and the second point satisfy the spatial relationship comprises:
determining a distance between the ego-vehicle at the first point and the another actor at the second point;
determining a speed of the another actor;
determining an acceleration of the ego-vehicle;
executing, based at least on the distance, the speed, and the acceleration, a lookup in a 1D lookup to determine an interval of speeds for the ego-vehicle;
comparing an actual speed of the ego-vehicle to the interval of speeds; and
determining that the actual speed is within the interval of speeds.

15. The system of claim 11, wherein the generation of the first vehicle-occupied projection comprises:
computing a subscribing shape for the ego-vehicle at the first time instance;
determining an updated subscribing shape for the ego-vehicle based at least on the first safety procedure and state information of the ego-vehicle; and
connecting one or more vertices of the subscribing shape and the updated subscribing shape.

16. The system of claim 11, wherein the generation of the first vehicle-occupied projection comprises:
generating, based at least on the proposed path and in three-dimensional space corresponding to space and time, the first vehicle-occupied projection representative of one or more first points of the ego-vehicle if the ego-vehicle were to implement the first safety procedure at the first time instance; and
projecting the first vehicle-occupied projection into two-dimensional space.

17. The system of claim 11, further comprising determining, based at least on analyzing the third boundary with respect to the fourth boundary, that the fourth boundary is fully contained within the third boundary, the analyzing including casting semi-infinite rays from vertices of the actor-occupied projection and counting a number of intersections of the semi-infinite rays with the third boundary.

18. The system of claim 11, wherein the generation of the third boundary associated with the ego-vehicle comprises generating the third boundary to include at least the first boundary and the second boundary.

19. One or more processors comprising:
processing circuitry to:
generate a first vehicle-occupied projection corresponding to a first boundary associated with an ego-vehicle in an environment if the ego-vehicle were to implement a first safety procedure at a first time instance along a proposed path and a second vehicle-occupied projection corresponding to a second boundary associated with the ego-vehicle in the environment if the ego-vehicle were to implement the first safety procedure at a second time instance along the proposed path;
generate a first actor-occupied projection corresponding to a third boundary associated with the actor in the environment if the actor were to implement a second safety procedure at the first time instance along an estimated path and a second actor-occupied projection corresponding to a fourth boundary associated with the actor in the environment if the actor were to implement the second safety procedure at the second time instance along the estimated path;

determine, based at least on whether the first boundary intersects with the third boundary and whether the second boundary intersects with the fourth boundary, a weight associated with the proposed path;

select, based at least on the weight, the proposed path for the ego-vehicle through the environment; and cause, based at least on the proposed path, performance of one or more operations associated with control of the ego-vehicle.

20. The one or more processors of claim 19, wherein:

the first safety procedure is associated with one or more second operations for controlling the ego-vehicle to avoid a collision; and the second safety procedure is associated with one or more third operations for controlling the actor to avoid the collision.

21. The one or more processors of claim 19, wherein the processing circuitry is further to:

determine a first amount of overlap between the first boundary and the third boundary; and determine a second amount of overlap between the second boundary and the fourth boundary, wherein the weight associated with the proposed path is based at least on the first amount of overlap and the second amount of overlap.

* * * * *